United States Patent [19]

Safinya et al.

[11] Patent Number: 4,839,644

[45] Date of Patent: Jun. 13, 1989

[54] SYSTEM AND METHOD FOR COMMUNICATING SIGNALS IN A CASED BOREHOLE HAVING TUBING

[75] Inventors: Kambiz A. Safinya, Ridgefield, Conn.; Roger W. McBride, Tulsa, Okla.

[73] Assignee: Schlumberger Technology Corp., New York, N.Y.

[21] Appl. No.: 61,066

[22] Filed: Jun. 10, 1987

[51] Int. Cl.[4] .............................................. G01V 1/00

[52] U.S. Cl. .................................. 340/854; 340/855; 166/250; 175/40

[58] Field of Search ............... 340/853, 854, 855, 856, 340/857; 367/81, 82, 77; 166/250; 175/40, 50; 324/338, 342

[56] References Cited

U.S. PATENT DOCUMENTS

| | | | |
|---|---|---|---|
| 2,225,668 | 12/1940 | Subkow | 177/352 |
| 2,354,887 | 8/1944 | Silverman et al. | 177/352 |
| 2,400,170 | 5/1946 | Silverman | 177/351 |
| 2,411,696 | 11/1946 | Silverman et al. | 340/856 |
| 2,414,719 | 1/1947 | Cloud | 178/44 |
| 2,492,794 | 12/1949 | Goble et al. | 250/2 |
| 2,653,220 | 9/1953 | Bays | 250/3 |
| 2,940,039 | 6/1960 | Yost et al. | 324/70 |
| 2,989,621 | 6/1961 | Barton et al. | 250/4 |
| 2,992,325 | 7/1961 | Lehan | 250/3 |
| 3,090,031 | 5/1963 | Lord | 340/18 |
| 3,150,321 | 9/1964 | Summers | 325/28 |
| 3,186,222 | 6/1965 | Martin | 73/151 |
| 3,315,224 | 4/1967 | Ferguson | 340/18 |
| 3,333,239 | 7/1967 | Silverman | 340/18 |
| 3,408,561 | 10/1968 | Redwine et al. | 324/6 |
| 3,437,992 | 4/1969 | Johnston | 340/18 |
| 3,495,209 | 2/1970 | Engle | 348/4 |
| 3,732,728 | 5/1973 | Fitzpatrick | 73/151 |
| 3,737,845 | 6/1973 | Maroney | 340/18 |

(List continued on next page.)

FOREIGN PATENT DOCUMENTS

| | | |
|---|---|---|
| 8000727 | 4/1980 | PCT Int'l Appl. . |
| 00265 | 1/1986 | PCT Int'l Appl. . |
| 8600112 | 1/1986 | PCT Int'l Appl. . |
| 8603545 | 6/1986 | PCT Int'l Appl. . |
| 2076039 | 11/1981 | United Kingdom . |
| 2083321 | 3/1982 | United Kingdom . |
| 2194413 | 3/1988 | United Kingdom . |

OTHER PUBLICATIONS

"Interpretation of Fracturing Pressures", Nolte et al., SPE, 1981.

"The Real-Time Calculation of Accurate Bottomhole Fracturing Pressure from Surface Measurements", R. R. Hannah et al., SPE, 1983.

"Prediciton of Formation Response from Fracture Pressure Behavior", M. W. Conway et al., SPE, 1985.

"Computerized Field System for Real Time Monitoring and Analysis of Hydraulic Fracturing Operations", M. P. Cleary et al., SPE, 1986, pp. 477–482.

(List continued on next page.)

*Primary Examiner*—Deborah L. Kyle
*Assistant Examiner*—J. Woodrow Eldred
*Attorney, Agent, or Firm*—Keith Smith; Peter Lee; Martin Novack

[57] ABSTRACT

A system and method are disclosed for wireless two-way communication in a cased borehole having tubing extending therethrough. A downhole communications subsystem is mounted on the tubing. The downhole subsystem includes a downhole antenna for coupling electromagnetic energy in a TEM mode to and/or from the annulus between the casing and the tubing. The downhole subsystem further includes a downhole transmitter/receiver coupled to the downhole antenna, for coupling signals to and/or from the antenna. An uphole communications subsystem is located at the earth's surface, and includes an uphole antenna for coupling electromagnetic energy in a TEM mode to and/or from the annulus, and an uphole receiver/transmitter coupled to the uphole antenna, for coupling the signals to and/or from the uphole antenna. In accordance with a feature of the invention, the annulus contains a substantially non-conductive fluid (such as diesel, crude oil, or air) in at least the region of the downhole antenna and above.

57 Claims, 20 Drawing Sheets

U.S. PATENT DOCUMENTS

| | | | |
|---|---|---|---|
| 3,793,632 | 2/1974 | Still | 340/18 |
| 3,831,138 | 8/1974 | Rammner | 340/18 |
| 3,866,678 | 2/1975 | Jeter | 166/66 |
| 3,905,010 | 9/1975 | Fitzpatrick | 340/18 |
| 3,967,201 | 6/1976 | Rorden | 325/28 |
| 4,001,773 | 1/1977 | Lamel et al. | 340/18 |
| 4,015,234 | 3/1977 | Krebs | 340/18 |
| 4,023,136 | 5/1977 | Lamensdorf et al. | 340/18 |
| 4,057,781 | 11/1977 | Scherbatskoy | 340/856 |
| 4,087,781 | 5/1978 | Grossi et al. | 340/18 |
| 4,160,970 | 7/1979 | Nicolson | 340/18 |
| 4,181,014 | 1/1980 | Zuvela et al. | 73/151 |
| 4,215,425 | 7/1980 | Waggener | 367/83 |
| 4,215,426 | 7/1980 | Klatt | 367/83 |
| 4,215,427 | 7/1980 | Waggener et al. | 367/83 |
| 4,266,578 | 5/1981 | Swain et al. | 138/110 |
| 4,302,757 | 11/1981 | Still | 340/854 |
| 4,348,672 | 9/1982 | Givler | 340/854 |
| 4,363,137 | 12/1982 | Salisbury | 455/40 |
| 4,387,372 | 6/1983 | Smith et al. | 340/854 |
| 4,463,805 | 8/1984 | Bingham | 166/248 |
| 4,496,174 | 1/1985 | McDonald et al. | 285/53 |
| 4,501,002 | 2/1985 | Auchterlonie | 375/86 |
| 4,525,715 | 6/1985 | Smith | 340/854 |
| 4,534,424 | 8/1985 | Ramsey | 175/40 |
| 4,578,675 | 3/1986 | MacLeod | 340/855 |
| 4,584,675 | 4/1986 | Peppers | 367/81 |
| 4,616,702 | 10/1986 | Hanson et al. | 166/65.1 |
| 4,617,960 | 10/1986 | More | 137/554 |
| 4,630,243 | 12/1986 | MacLeod | 367/82 |
| 4,684,946 | 8/1987 | Issenmann | 340/855 |
| 4,691,203 | 9/1987 | Rubin et al. | 340/856 |
| 4,724,434 | 2/1988 | Hanson et al. | 340/857 |
| 4,725,837 | 2/1988 | Rubin | 340/855 |

OTHER PUBLICATIONS

"Spread Spectrum Systems", R. C. Dixon, John Wiley & Sons, 1984, pp. 86–91.

"Spread-Spectrum RF Schemes Keep Military Signals Safe", R. Allan, Electronic Design, Apr. 3, 1986, pp. 111–122.

"The Fourier Integral Its and Applications", A. Papoulis, McGraw-Hill, 1962, pp. 14–28.

"Signal Processing", M. Schwartz, McGraw Hill, 1975, pp. 251–260, 298–308.

"Helical Bucking of Tubing Sealed in Packers", A. Lubinski, Petroleum Transactions, 1961, pp. 655–670.

"Electromagnetic Concepts and Applications", G. Stitek et al., Prentice Hall, 1982, pp. 156–158, 299, 371–377.

"Signals, Systems and Communication", B. P. Lahti, John Wiley & Sons, 1965, pp. 443–456.

"Deconvolution of Geophysical Time Series in the Exploration for Oil and Natural Gas", M. Silvia et al., Elsevier Publishing, 1979, pp. 92–105.

"Impedance of Hydraulic Fractures; Its Measurement and Use for Estimating Fracture Closure Pressure and Dimensions", G. R. Holzhausen, SPE, 1985, pp. 411–417.

"Logging While Drilling: A Survey of Methods and Priorities", W. J. McDonald et al., SWPLA Logging Symposium, 1976, pp. 1–15.

$\mu p$, $\mu f$ = RESPECTIVE PERMEABILITIES OF PIPE AND ANNULAR FLUID
$\rho p$, $\rho f$ = RESPECTIVE RESISTIVITIES OF PIPE AND ANNULAR FLUID
$\varepsilon f$ = PERMITTIVITY OF ANNULAR FLUID

SYSTEM AND METHOD FOR COMMUNICATING SIGNALS IN A CASED BOREHOLE HAVING TUBING

BACKGROUND OF THE INVENTION

This invention relates to communications in an earth borehole and, more particularly, to a wireless telemetry system and method for communication in a cased borehole in which tubing is installed. The invention further relates to the communication of information in such a system, in close to real time, during perforation, testing, stimulation (such as fracturing) and production.

During perforation, testing, stimulation, treating, and/or production of a well, it would be very advantageous to have accurate information concerning conditions downhole; particularly, conditions such as pressure, temperature, fluid flow rate, weight on a packer, etc. Techniques for utilizing information concerning these conditions have advanced in recent years. Accordingly, if suitable information concerning downhole conditions is available, the interpretation resulting therefrom can be used to make decisions that can greatly enhance the ultimate production and cost efficiency of the well. An example is the so-called Nolte-Smith technique for interpretation of fracturing pressures (see "Interpretation Of Fracturing Pressures", Nolte et al., SPE, 1981), which is widely used in industry, and has intensified the desire for continuous bottom-hole pressure data. The importance of obtaining these data as they occur (in close to real time), for example for controlling a fracturing operation, is substantial (see, for example, "The Real-Time Calculation Of Accurate Bottomhole Fracturing Pressure From Surface Measurements", R. H. Hannah et al., SPE, 1983; "Prediction Of Formation Response From Fracture Pressure Behavior", M. W. Conway et al., SPE, 1985; "Computerized Field System For Real Time Monitoring And Analysis Of Hydraulic Fracturing Operations", M. P. Cleary et al., SPE, 1986). However, to Applicants' knowledge, there is no currently existing technique for obtaining measurements of downhole conditions that does not have significant drawbacks.

Among the existing techniques for obtainment of data on downhole conditions with tubing in place, are the following:

1. Data can be taken with a measuring instrument downhole, and recovered after completion of the job. This has the obvious drawback of the unavailability of the data during the job, and limitations on downhole power and data collecting ability.

2. In a situation of a packerless completion, the bottom hole pressure can be estimated at the surface via measurement of the annular static fluid column. This provides only a low frequency filtered pressure measurement. Also, the casing is exposed to treating pressures.

3. Bottom-hole conditions can be approximated from conditions measured uphole, for example pressure, fluid properties, etc. However, the accuracy of these indirect measurements is generally poor. Among the reasons, is the close proximity to surface pumping noise.

4. Sensing devices can be placed downhole with an electrical cable strapped to the outside of tubing, or run inside the tubing, or can be lowered after the fact to connect downhole or to interrogate a downhole device. These techniques have obvious advantages in providing a good communications link. However, in addition to the cost of the cabling, the possibility of the cable tangling, interfering with mechanical structure and/or fluid flow, breaking, or not making suitable contact downhole, renders this technique less than ideal in many applications.

The prior art describes a variety of wireless communications systems for measurement while drilling. Some of these are measurement-while-drilling systems that utilize the drill pipe and the formations (and/or metal casing, to the extent present) to transmit electromagnetic signals over a "transmission line" that includes the drill string as a central conductor, and the formations (and/or casing, as the case may be) as outer conductors.

In the U.S. Pat. No. 4,057,781 Scherbatskoy, there is disclosed a measurement and communications system for measurement while drilling which employs a cable for communication between sensing devices located near the drill bit and an intermediate communications system that is first mounted at the top of the drill string when a round-trip drill bit change is implemented. As drilling proceeds, drill pipes having an insulating coating painted thereon are added to the string, so that the intermediate communications system will eventually be a few hundred feet below the earth's surface. Rubber drill collar protectors are provided to prevent the drill pipe from rubbing against the casing. Communication between the intermediate communication system and a surface communications system is wireless. A toroidal antenna at the intermediate communications system launches a signal that is received by a toroidal antenna at the surface, the toroidal antenna surrounding a conductor that is connected between structure coupled to the drill string and the metal borehole casing. (Alternatively, the patent notes, potential between the drill string and the casing can be utilized.) The wireless link can be utilized for two-way communication, and can also be used for sending power downhole for operation without a battery or for charging a battery. The patent states that an important feature of the invention is to have the intermediate communication system away from the drill bit environment, and also indicates that the communication between the intermediate communication system and the surface is practical over only relatively short distances, for example, 1000 feet. Among the practical limitations of the apparatus described in this patent are the need for a cable between the intermediate communications and the system near the bottom of the hole, the need for providing an insulating coating on the upper portion of the drill string, and the limitations on the length of the wireless communication.

Other measurement while drilling schemes, communication systems, and control systems, are described in the following U.S. Pat. Nos. 2,225,668 2,354,887 2,400,170 2,414,719 2,492,794 2,653,220, 2,940,039 2,989,621 2,992,325 3,090,031 3,315,224 3,408,561 3,495,209 3,732,728 3,737,845 3,793,632 3,831,138 3,967,201 4,001,773 4,087,781 4,160,970 4,215,425 4,215,426 4,215,427 4,226,578 4,302,757 4,348,672 4,387,372 4,496,174 4,525,715 4,534,424 and 4,578,675.

Whereas a variety of wireless communication systems have been proposed for measurement while drilling, there has been a dearth of viable proposals for wireless communication in a cased borehole in which tubing is in place, and in which perforation, testing, stimulation, and/or production are typically to be implemented. The prospect of having wireless downhole communications in such a system, which can be used to communicate information in almost real time, and over relatively long periods of time, would appear to be a difficult objective. This is especially true if it is desired to have the system be operative to communicate with reasonable accuracy and data rate during operations which exacerbate the already hostile downhole conditions; for example, testing, stimulation, etc. These operations can involve severe pressure, temperature, and mechanical vibrations in the downhole environment and uncontrolled motion of the tubing.

It is among the objects of the present invention to provide a wireless communication system and method for use in a cased borehole that has been equipped with tubing. It is among the further objects of the invention to provide such a communications system which can operate under adverse conditions, including conditions that severely perturb the transmission path for communication; which can provide two way wireless communication between the earth's surface and one or more downhole locations; which is capable of communicating power to a downhole location, where the power is converted to a form suitable for use in operating the downhole subsystem or for storage for later use for such purpose; and which employs a coding scheme that permits accurate transmission of data, and which can be adapted for changes in the characteristics of the transmission path during particular conditions.

SUMMARY OF THE INVENTION

The system and method of the present invention has particular application for use in an earth borehole which is cased with an electrically conductive casing and has electrically conductive tubing extending therethrough. In accordance with the system of the invention, there is provided a communication system for communicating between downhole and the earth's surface. A downhole communications subsystem is mounted on the tubing. The downhole subsystem includes a downhole antenna means for coupling electromagnetic energy in a TEM mode to and/or from the annulus between the casing and the tubing. The downhole subsystem further includes a downhole transmitter/receiver coupled to the downhole antenna means, for coupling signals to and/or from the antenna means. An uphole communications subsystem is located at the earth's surface, and includes uphole antenna means for coupling electromagnetic energy in a TEM mode to and/or from the annulus, and an uphole receiver/transmitter coupled to the uphole antanna means, for coupling the signals to and/or from the uphole antenna means. In accordance with a feature of the invention, the annulus contains a substantially non-conductive fluid (such as diesel, crude oil, or air) in at least the region of the downhole antenna means and above. A packer is mounted on the tubing below the downhole communications subsystem, and is operative, inter alia, to prevent incursion of fluid into the annulus above the packer.

An advantage of the communications link utilized in the present invention is that transmission losses can be kept relatively low (since the annulus between the tubing and the casing has been filled with a non-conductive fluid), so less power is needed for transmission of information. This tends to reduce the downhole power requirements and permits operation with less battery power, when a battery is employed downhole. Further, since the power needed for transmission of data is not unduly high, the data rates can be higher than they could be if conservation of power was a critical limiting factor. The relatively high efficiency of the transmission link also facilitates battery-less operation or operation with a rechargeable battery. This can be achieved by transmitting power downhole and using the received power downhole as a source for a downhole power supply that energizes the downhole equipment and/or charges a downhole rechargeable battery. Further benefits of lower power consumption include extended temperature application (where reduced battery power would normally be expected to be a limiting factor), and reduced mechanical cost and tool size, since the elimination of need for battery replacement and smaller batter size both lead to manufacturing advantages. Further, the invention has advantages for use in reservior monitoring during the production phase of a well.

The transmission link of the present invention also benefits from other features hereof, which are described in detail below. Briefly, a spread-spectrum coding scheme is employed, which is found to be particularly effective in accurately carrying information of the transmission link, even in the presence of conditions that cause substantial random interference. In an embodiment hereof, the coding scheme is adaptive to take account of changing conditions of the transmission path. In a further embodiment hereof, a demodulation technique is utilized at the receiver to improve performance of the communication system during times when periodic motion of the tubing might be encountered.

Further features and advantages of the invention will become more readily apparent from the following detailed description when taken in conjunction with the accompanying drawings.

DESCRIPTION OF THE PREFERRED EMBODIMENT

Figure 1:
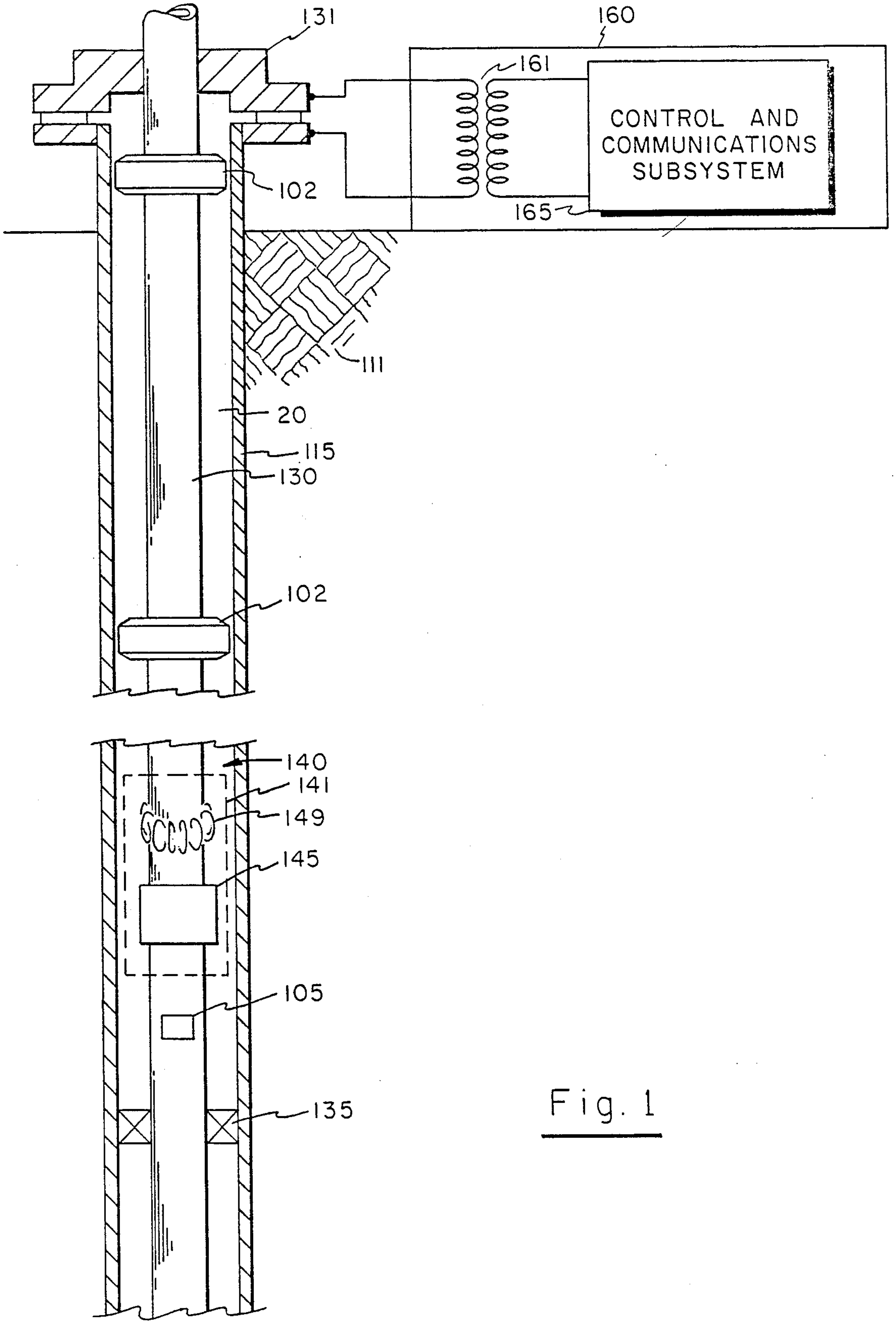
FIG. 1 is a simplified schematic diagram, partially in block form, of a system in accordance with an embodiment of the invention, and which can be used to practice the method of the invention.

Referring to FIG. 1, there is shown a simplified schematic diagram of a system in accordance with the invention and which can be used to practice the method of the invention. Earth formations 111 are traversed by a borehole that has been cased with a steel casing 115. In this illustration, the borehole has been equipped with steel tubing 130 that may be conventionally employed during or for perforation, stimulation, testing, treating, and/or production. As used herein, the term "tubing" is intended to generically include an elongated electrically conductive metal structure having an internal passage which can pass fluid through most or all of its length, and having a periphery that is smaller, over most of its length, than the radius of the cased borehole in which it extends.

The downhole apparatus 140 is mounted, in FIG. 1, on one of the lower sections of tubing, and above a packer 135. The downhole apparatus 140 is shown as being contained within a tool enclosure 141, and includes a downwhole sensing and communications subsystem 145 and at least one antenna means which, in the illustrated embodiment, is a toroidal antenna 149. Protective collars, such as are shown at 102, are of an insulating material, and help prevent contact between the tubing and casing. These collars are spaced closer together at greater depths to prevent buckling under the higher forces encountered. An uphole apparatus 160 includes an uphole antenna means 161, which, in the present embodiment, comprises a transformer having one of its windings coupled across the casing 115 and the tubing 130 and the other of its windings coupled to a control and communications subsystem 165.

In the present invention, electromagnetic energy in a transverse electromagnetic ("TEM") mode is launched in he annulus defined by the region 20 inside the casing and outside the tubing. A substantially non-conductive fluid, for example diesel or crude oil or air, is put in the annulus, and serves as the non-conductive dielectric in the transmission line model. Without such fluid in place, transmissions over relatively long distances (more than a few hundred feet) will generally suffer high attenuation and be of limited use. The packer 135 serves, inter alia, to prevent incursion of conductive fluid from below the packer into the annulus of the transmission line.

The uphole antenna means may alternatively be a toroid around the tubing 130, or any other suitable excitation and/or sensing means that excites and/or senses electromagnetic energy in a TEM mode which propagates in the annulus between the tubing and the casing. The downhole antenna means 149 may also be any suitable excitation and/or sensing means. In the present embodiment, wherein the packer 135 is assumed to be electrically conductive, there is effectively a short at the bottom of the coaxial transmission line, and the toroidal antenna is an effective exciter and/or sensor. If necessary or desired, a conductive pin can be employed to ensure a short of tubing to casing below the downhole communications subsystem. [If there is not such short near the downhole antenna (e.g. an insulating packer or no packer), or the downhole antenna is positioned a considerable distance (comparable to a quarter wavelength) above such short, a signal impressed between the tubing and casing or a gap in either the tubing or casing, may be desirable.] At the earth's surface, the spacing between the casing and tubing (at an insulating flange 131) is effectively an open circuit at the top of the transmission line, so signal can be efficiently sensed across the gap; e.g. with a high impedance voltage measurement or a lower impedance current measurement (that would close the open circuit).

From the standpoint of current flow, the current flow path in FIG. 1 can be visualized as follows: down from the lower surface of the insulated well head flange 131, through the casing 115 to the packer 135, across the packer 135 to the tubing 130, up through the downhole communication system 141 and tubing 130 to the surface, across the slips 189 (see FIG. 4), and then down again to the upper surface of the insulated flange. To prevent interference, a rig isolator (such as an insulating sleeve—not shown) and treating iron insulator (such as an insulated section of treating iron— not shown) can be provided.

Figure 2:
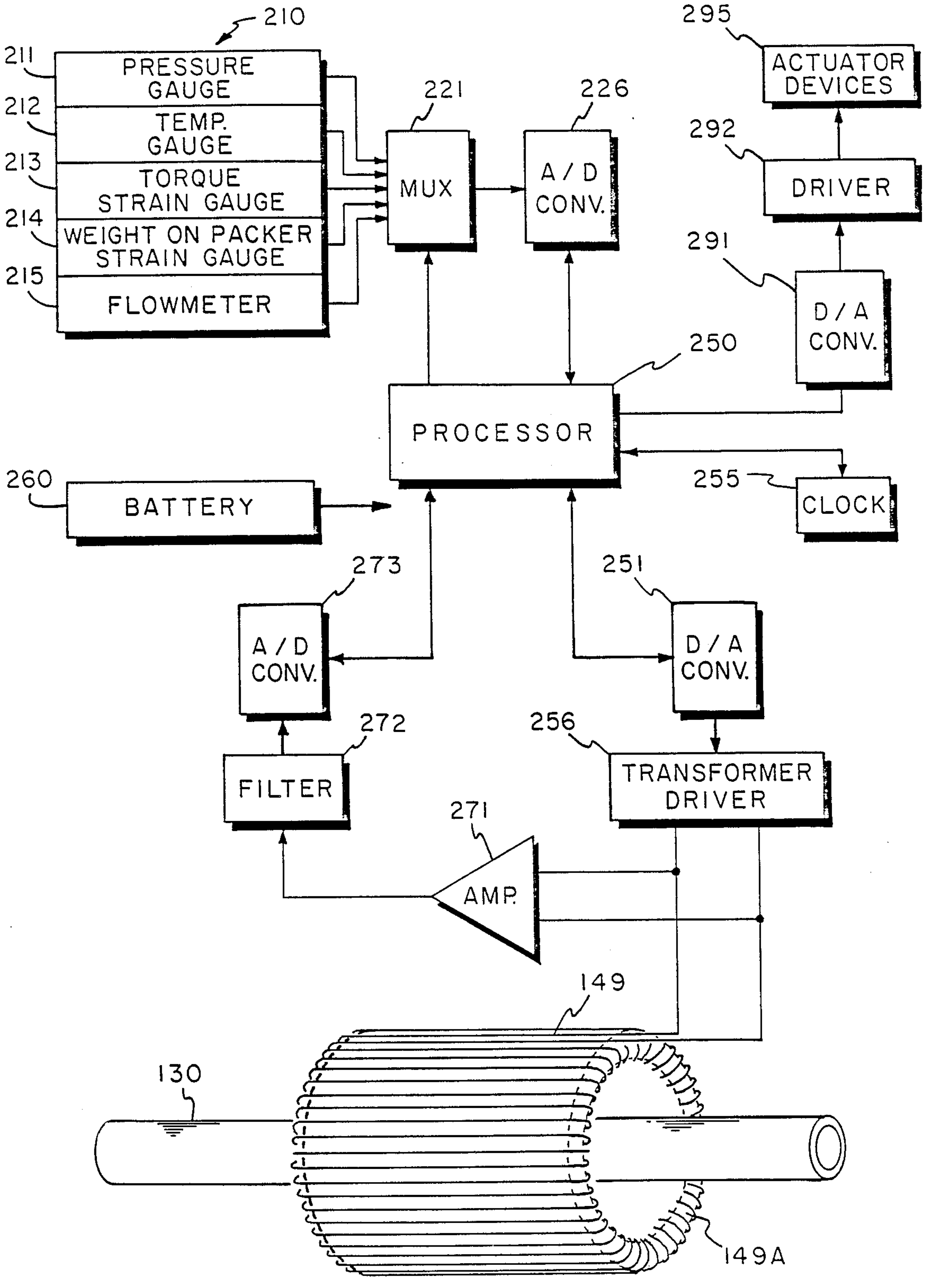
FIG. 2 is block diagram, partially in schematic form, of the downhole measuring and communications subsystem.

Referring to FIG. 2, there is shown a block diagram of an embodiment of thd downhole measuring and communications subsystem 141. In the illustration of FIG. 2, the conditions that can be measured downhole are pressure, temperature, torque, weight on packer, and fluid flow. These measurements are taken using sensing units 210 individually designated as pressure gauge 211, temperature gauge 212, strain gauges 213 and 214, and flowmeter 215. The electrical outputs of these measuring devices are coupled, via an analog multiplexer 221, to analog-to-digital converter 226, the output of which is coupled to a processor 250. The processor 250 may be any suitable processor, for example an Intel 8088 microprocessor, having associated memory, input/output ports, etc. (not shown). The processor 250 has a precision clock 255 associated therewith. A pressure-activated wakeup counter (not shown) can be employed, if desired, to cause activation from a low power mode, for example upon the onset of pumping. The processor 250 controls operation of the other downhole circuitry.

The processor 250 generates information signals, to be described, which are coupled, via digital-to-analog converter 251, to a transformer driver 256. The output of transformer driver is coupled to toroidal antenna 149 which, in this embodiment, is a toroidal coil wound on a cylindrical core 149A. The antenna 149 is concentric with the tubing 130, and generates the electromagnetic energy in a TEM mode that propagates in the annulus between the tubing and casing. Another way of viewing the generation of the transmitted energy is that the toroidal comprises one winding of a transformer in which the loop formed by the tubing, packer, casing etc. is the other winding.

Figure 3:
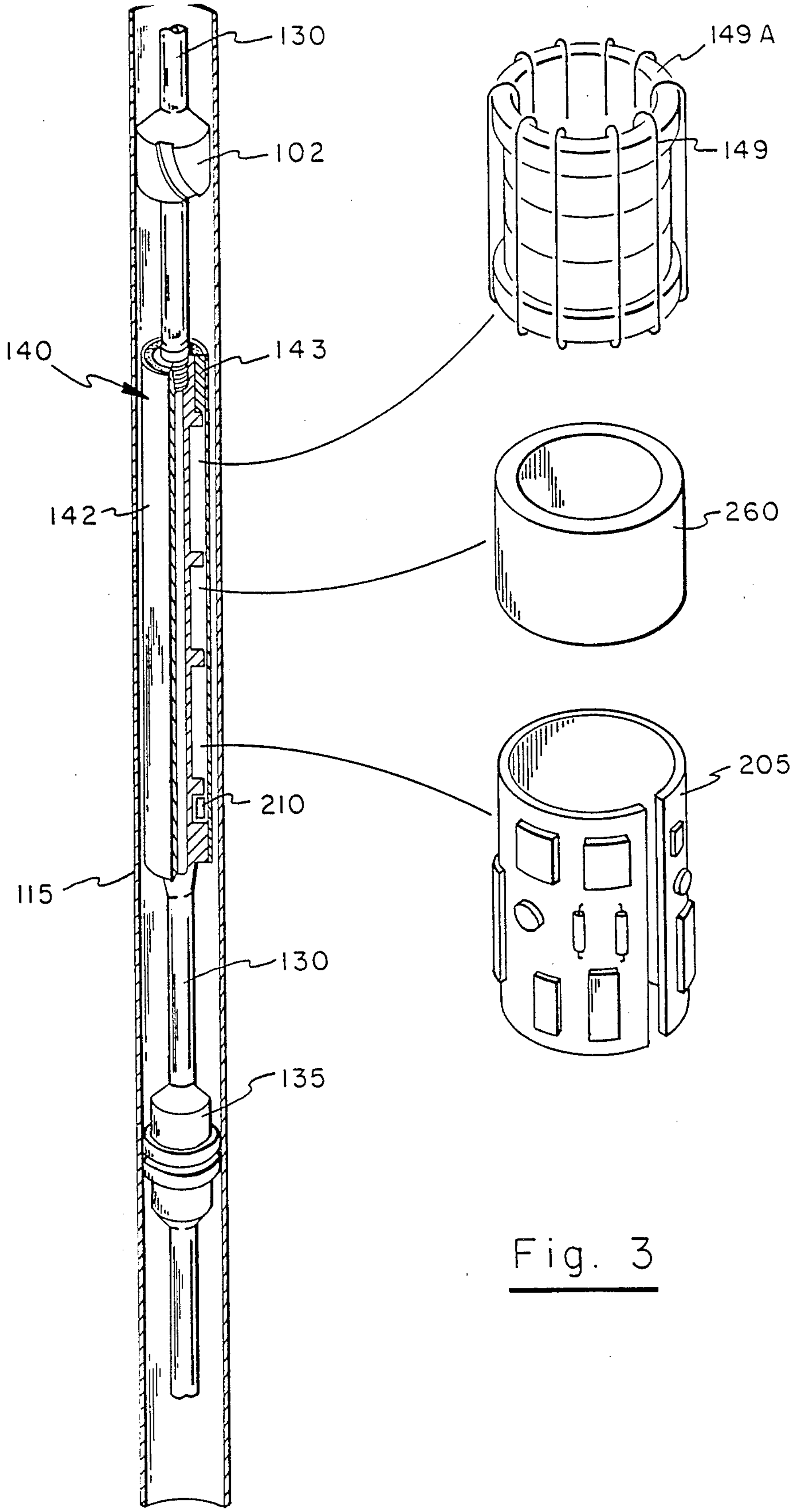
FIG. 3 illustrates a configuration of an embodiment of the downhole tool.

FIG. 3 shows an embodiment of a downhole tool configuration. In the illustration, the downhole subsystem 140 is formed on and concentric with a section of the tubing (which, if desired or necessary, can have a slightly reduced inner diameter), and includes the coil 149, battery 260, circuit board(s) 205, on which can be mounted the downhole circuitry of FIG. 2 and suitable housing for sensors 210. A protective metal outer cover 142, which is open-ended to permit passage of the transmitted or received energy, is insulated from the tubing by a barrel insulator 143. It will be understood that various alternative configurations and arrangements of the subsystem components can be employed.

Figure 4:
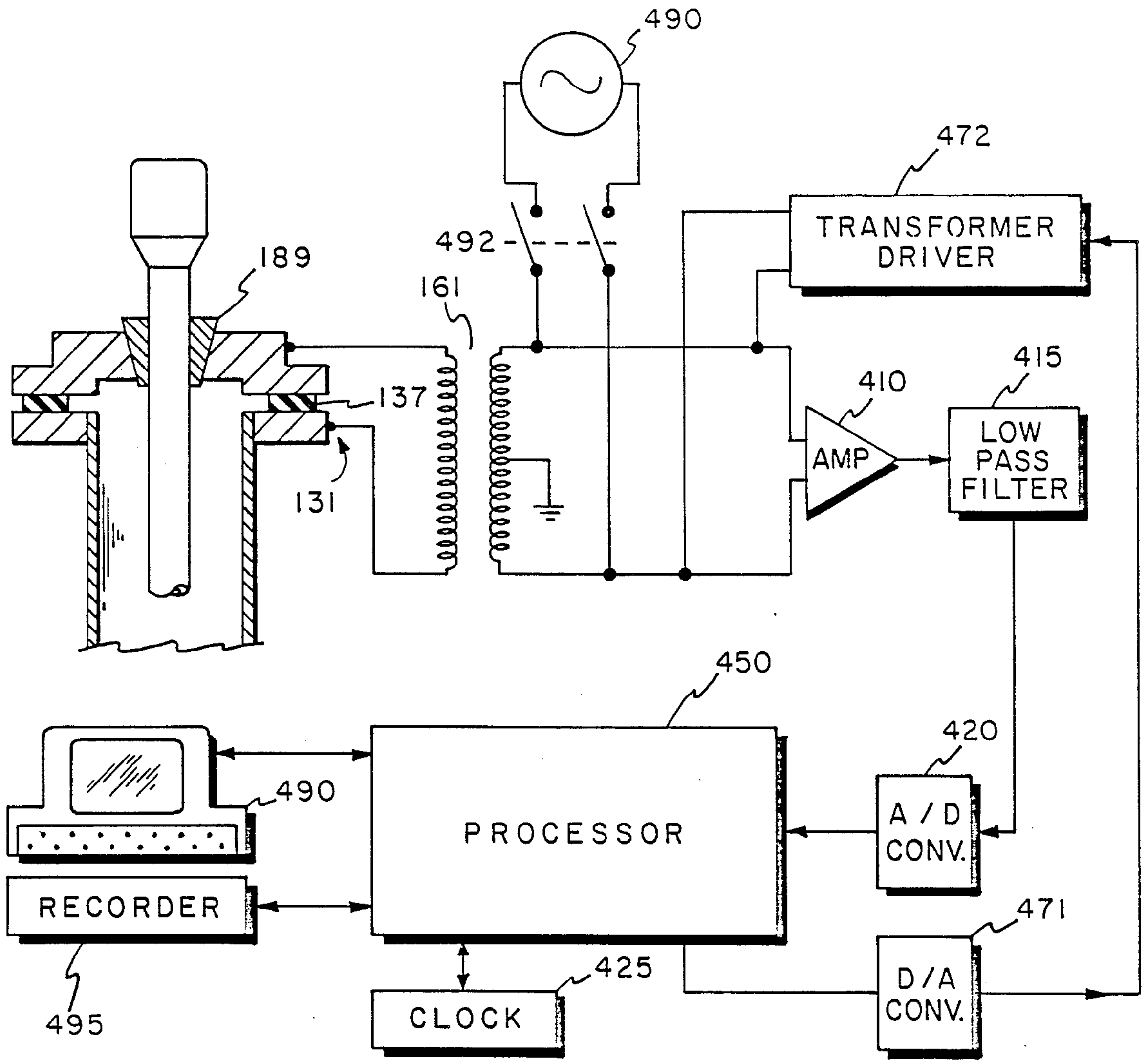
FIG. 4 is a diagram, partially in block form, of an embodiment of the uphole communications subsystem.

Referring to FIG. 4, there is shown a diagram, partially in block form, of an embodiment of the uphole communications subsystem as utilized in the system of FIG. 1. As first shown in FIG. 1, one winding of transformer 161 is coupled between the tubing and the casing at flange 131. As seen further in FIG. 4, this coupling can be across a flange that is mounted on the casing, the upper surface of the flange 131 being insulated from the lower surface thereof by an insulating gasket ring 137. The other transformer winding is coupled, in a balanced configuration, to a preamplifier 410 and then to a low-pass filter 415. The output of filter 415 is coupled to an analog-to-digital converter 420, the output of which is coupled to processor 450. The processor may comprise any suitable computer or microprocessor, for example, having associated memory, input/output ports, etc. (not shown). For example, a Motorola 68000 processor may be employed. Uphole clock 425 is provided in conjunction with the processor 450. As described further herein below, this clock can be synchronized with the downhole clock. A terminal 490 and a recorder 495 are also provided.

The description of FIGS. 2 and 4 thus far have been mostly concerned with transmission of signals from downhole to uphole. However, the transmission link of the present invention is bidirectional, and circuitry can be provided in the uphole and downhole subsystems to implement transmission from uphole to downhole of control information and/or power. In FIG. 4, information from processor 450 is coupled to digital-to-analog converter 471, and then to transformer driver 472, to drive the transformer 161 when the uphole subsystem is operating in a transmission mode. In FIG. 2, the toroidal coil 149 is coupled to amplifier 271, anti-aliasing filter 272, analog-to-digital 273, and then processor 250, when the downhole subsystem is operating in a receiving mode. Suiable switching and isolation circuits (not shown) can be provided, if necessary. In the diagram of FIG. 2, a further output of processor 250 is illustrated as being coupled, via digital-to-analog converter 291 and driver 292, to downhole actuator devices 295. These devices may typically include valves and any other suitable types of devices for actuation from uphole and/or in accordance with a programmed downhole routine.

Figure 5:
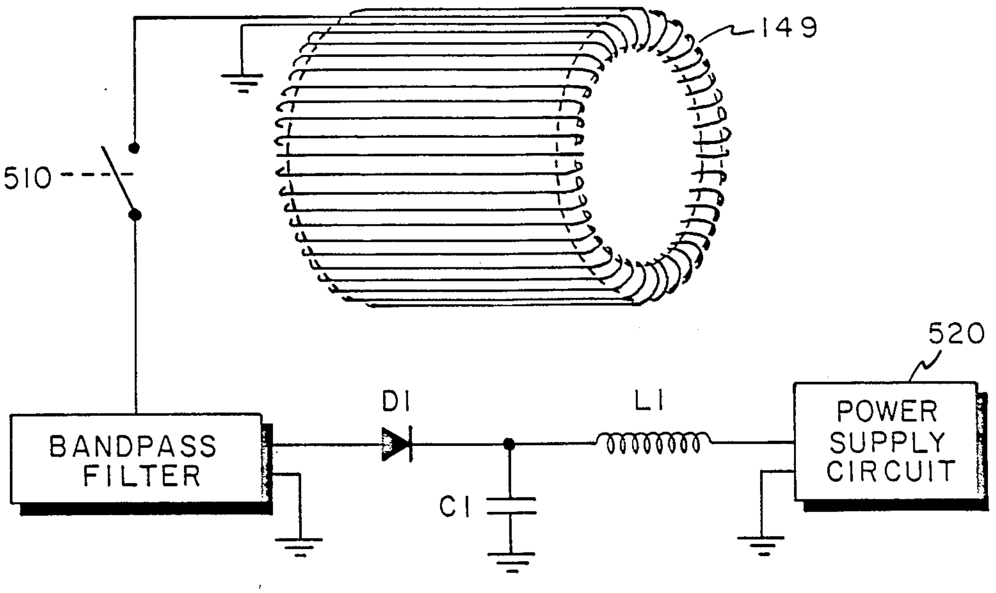
FIG. 5 illustrates a portion of an embodiment of the downhole subsystem, including a power driven by power transmitted from uphole.
Figure 6:
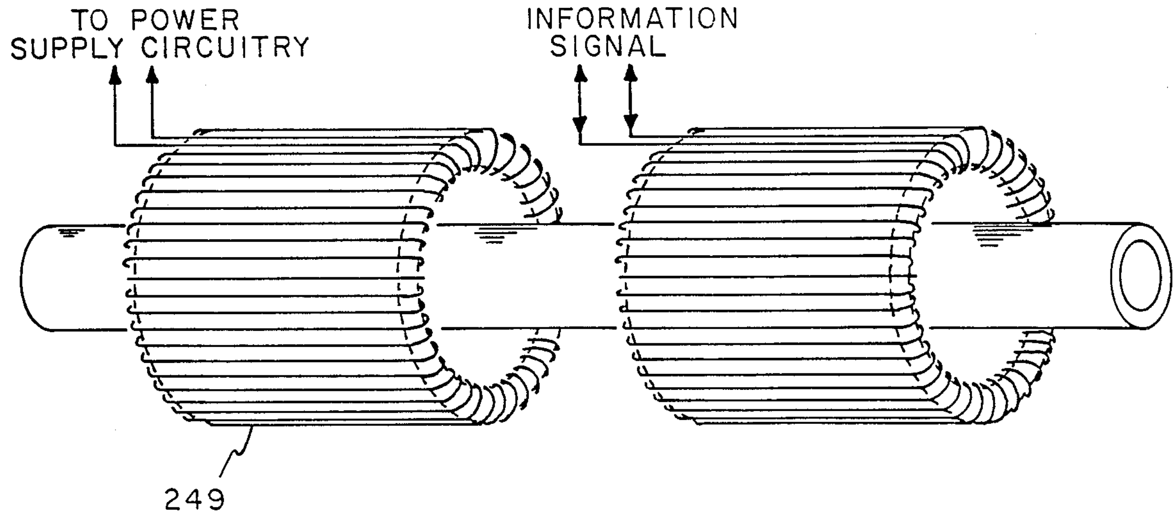
FIG. 6 is a diagram of a portion of an embodiment of the downhole subsystem utilizing two toroidal antennas.

In the embodiment of FIG. 2, the battery 260 is shown as providing power for the downhole circuitry. The transmission link of the present invention can also be used to transmit power from uphole to downhole, and the power can be utilized to run the downhole circuitry and/or to charge a rechargeable battery. For example, as shown in FIG. 5, a power supply circuit 520, which includes suitable rectification and smoothing circuitry, as represented by elements D1, C1 and L1, is coupled to the downhole antenna 149 via a semiconductor switch 510 (controlled by processor 250) and band-pass filter 515. In the uphole subsystem, an AC power source 490 is coupled to transformer 161 via switch 492, controlled by processor 450. There are a number of options with regard to the transmission of the power and its receipt downhole. If desired, the power signal can be sent during quiet periods of information signal transmission (in either the downhole or uphole signal directions), or the power signal can be sent simultaneously with transmission signals or with the information being transmitted to downhole being superimposed on the power signal. Regarding receipt of the power signal downhole, this can be done using the same receiving antenna as is used for the information signal, as previously illustrated. In FIG. 6, a separate receiver antenna 249 is illustrated as being provided for receiving the power signal. Another alternative is to provide separate antennas for transmitting and receiving, uphole and/or downhole.

In accordance with a feature of the invention, the annulus between the tubing and the casing is filled (at least, in the region of the transmission link) with a substantially non-conductive fluid, for example, diesel, crude oil, or air. In general, as used herein, a substantially non-conductive fluid is intended to mean a fluid having a conductivity of less than about 0.1 Siemens/meter, and it is preferred that the conductivity be less than about $10^{-3}$ Siemens/meter. There are various ways in which the desired non-conductive fluid can be put in place. As an example, conventional completion practices provide a facility to circulate fluids from/to the annulus to/from the tubing; for example a flow control valve 105 in the tubing immediately above the packer 135 (see FIG. 1). The value 105 can be controlled, for example, by rotating the tubing. Alternatively, this valve could be associated with the packer 135. Prior to treatment, the existing fluid can be circulated out and replaced, as desired, with the non-conductive fluid. After treatment (or at any other desired time), the insulating fluid can be circulated out with conventional fluid.

In the system and method of the present invention, Applicants have found that it is advantageous to utilize a so-called "spread-spectrum' technique of encoding information for transmission over the telemetry link. For background on spread-spectrum techniques see, for example, "Spread Spectrum Techniques", R. C. Dixon, IEEE Press, 1976; "Spread Spectrum Systems", R. C. Dixon, John Wiley & Sons, 1984; "Spread-Spectrum RF Schemes Keep Military Signals Safe", R. Allan, Electronic Design, Apr. 3, 1986. It is known that a narrow spectrum is analogous to a broad or spread unresolved time response, whereas, conversely, a broad or spread spectrum is analogous to a narrow well-defined time response. [See e.g. "The Fourier Integral And Its Applications", A. Papoulis, McGraw-Hill, 1962.] In the encoding used herein, a continuous monochromatic carrier wave is conceptually portioned into a contiguous sequence of single-cycle wavelets or "chips"; a fixed-length pseudorandom (plus- and minus-) sign sequence is then assigned to a contiguous set of chips, thus constituting one "on" bit of binary information. By reversing the signs of the entire pseudorandom sign sequence, one "off" bit of binary information is created.

Figure 7:
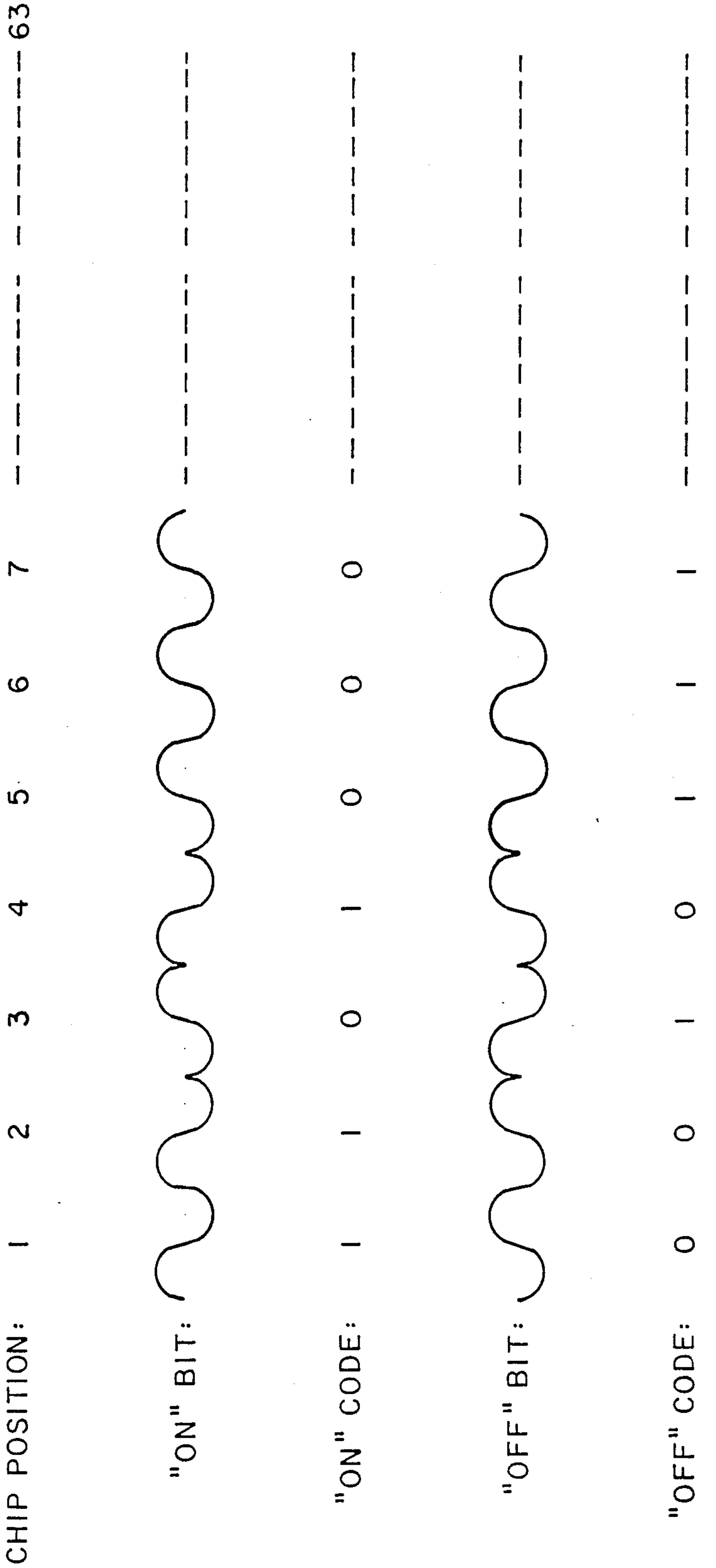
FIG. 7 illustrates a portion of a sequence of a pseudo-random code of the type utilized in an embodiment of the invention.

In an example hereof, each message sent over the telemetry system comprises 15 contiguous bits, with each bit being represented by 63 pseudorandom sign-coded chips. As above stated, the code representing the two possible states of a bit are the reverse of each other at each chip. Thus, for example, if the pseudorandom code or an "on" bit is "1101000 . . . ", the code for an "off" bit would be "0010111 . . . ". FIG. 7 illustrates the seven "chips" at the beginning of this sequence, with the top waveform showing the beginning of the sequence (for this particular pseudorandom code) for an "on" bit, and the bottom waveform showing the reverse pattern, which is the beginning of the sequence for an "off" bit. It is seen that in the convention used in this illustration, a chip having a positive polarity portion followed by a negative polarity portion is designated as a "1" chip, whereas a chip having a negative polarity portion followed by a positive polarity portion is designated as a "0" chip. If one "digital value" of information (pressure, temperature, etc.) is obtained by chaining together 15 contiguous bits of information, for a 63 chip code, and a chip (carrier) frequency of 500 Hz, one 15 binary bit value of information would be contained in a signal packet of time duration $15\times63\times(1/500)=1.89$ sec. At. a chip frequency of 1000 Hz, the time duration would be 0.95 sec., and so on. The well-known Nyquist "sampling theorem" requires a sampling rate of twice the highest frequency expected in the incoming analog signal. This assures that digital signal processing techniques will function properly and that the continuous analog signal can be recovered at any processing step, if so desired. If basic system "carrier" frequency is 500 Hz it has negligible energy above 1000 Hz and thus can be adequately sampled at 2000 Hz.

One chip of signal carries very little energy, and there are many chip-like sources of noise from which signals must be extracted. The spread-spectrum chains together a contiguous sequence of chips with a pseudorandom sign code imposed, thus creating a more energetic, unique signal element. It has been shown that the alternative chaining together of uncoded chips, which increases the total energy and distinctiveness of the signal, results in an undesirable compression of the chip's spectrum, and is an inferior approach for the present application. The generation of the pseudorandom sign code is a thoroughly studied topic. Optimal codes can be generated by "maximally tapped" shift register configurations with feedback. See, for example, "Analysis And Design Of Digital Systems", Uzunoglu et al., Gordon & Breach Publishers, 1984, or Dixon, 1984 (supra).

The basic "signal event", as shown in FIG. 7, is not well localized in time. However, its broad, spread spectrum assures that, with the proper phase filtering, that signal event can be significantly compressed in time. The "optimal" filter normally chosen for effecting the time compression is the "matched" filter (see, e.g., "Signal Processing", M. Schwartz, McGraw Hill, 1975). By design, the matched filter optimizes the signal excursion at a single point in time in the presence of Gaussian random noise.

The matched filter m(t) is simply the time reverse of the signal event to which it is being applied, thus effectively replacing each signal event with its zero-phase autocorrelation function. Thus, $m(t)=s(-t)$, where s(t) is a coded signal event like that shown in FIG. 7. The matched filtering operation f(t) becomes $$f(t)=m(t)*s(t)=s(-t)*s(t)=s(t)\otimes s(t),$$

where "$\otimes$" denotes cross-correlation.

Figure 8:
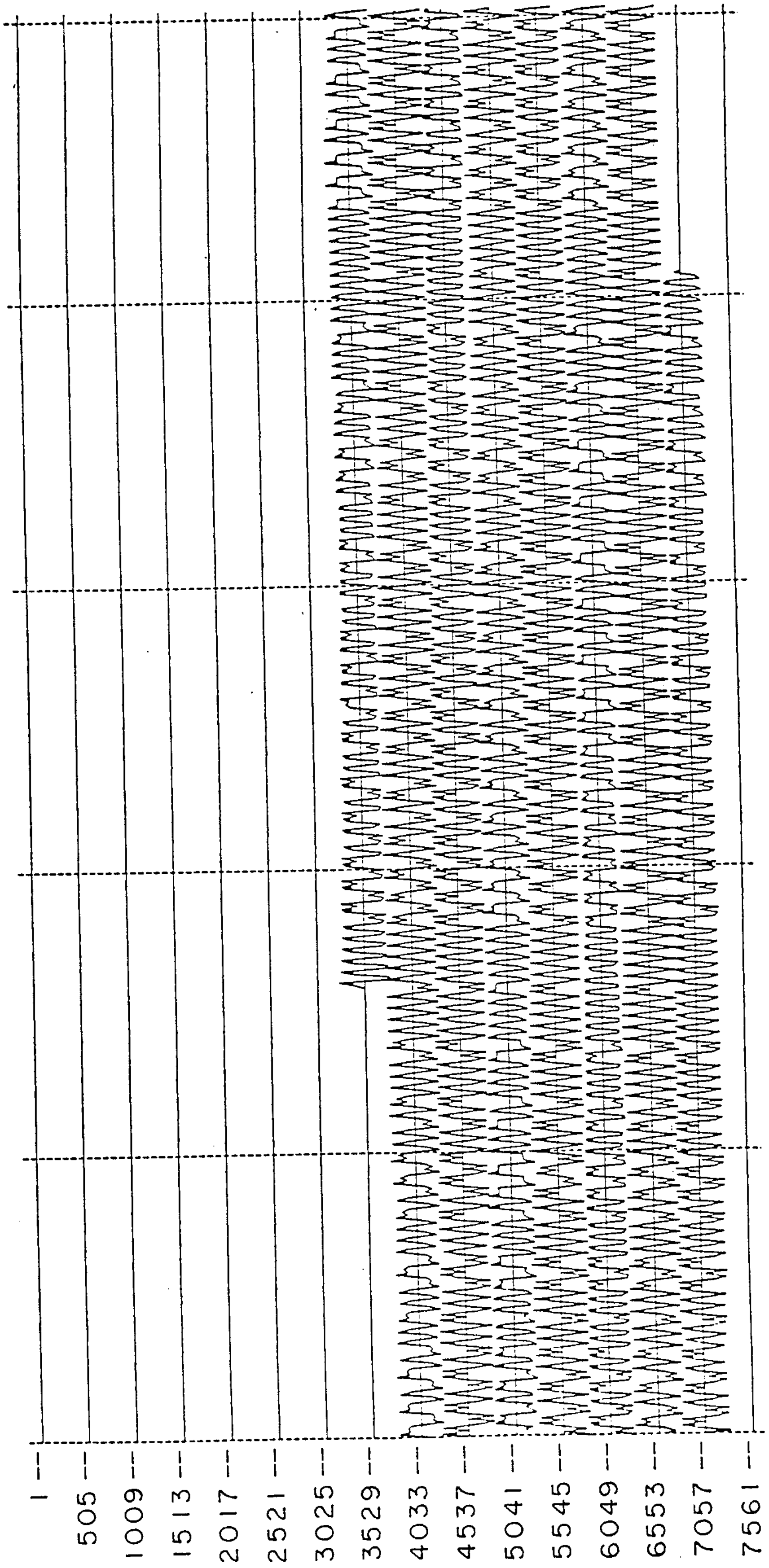
FIG. 8 shows an example of waveforms for a received message consisting of 15 bits of information.
Figure 9:
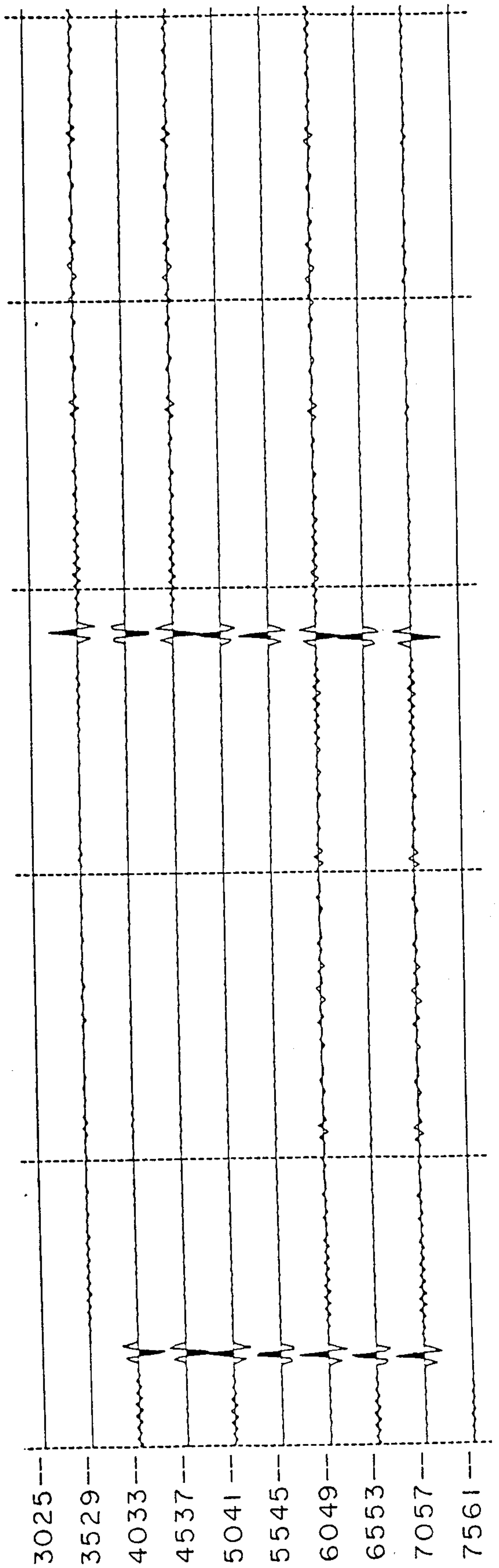
FIG. 9 illustrates the matched-filtered results obtained by autocorrelation of the FIG. 8 waveforms.

FIG. 8 shows an example of the waveforms for a received message consisting of 15 bits of information at 500 Hz. FIG. 9 illustrates the matched-filtered results obtained by autocorrelation. The 15 bits, and their polarities, are clearly visible as being "100001111101010".

An additional technique which can be utilized to advantage in the present invention is to have a repertoire of pseudorandom codes for possible use, and to adaptively select the code to be used at a particular time in accordance with the transfer function associated with the transmission link, as measured just before the time in question, or during a similar condition (e.g. testing, stimulation, etc.). This can be done, for example, indirectly, by sending the repertoire of possible codes from downhole in a predetermined sequence, and performing autocorrelation at the surface using the same sequence of codes. The code providing the cleanest autocorrelated signal can then be used for sending subsequent data. The selection process can then be repeated after a particular period of time or after a change in conditions. [In this regard, see further the flow diagram of FIGS. 11 and 13.] Alternatively, a particular test code sequence can be sent, and the transfer function of the transmission link can be computed from the received signal. The computed transfer function can then be convolved, at the surface with each of the repertoire of codes, and the best results selected; whereupon a control signal would be sent downhole to select the particular code to be used for subsequent data transmission.

Figure 10:
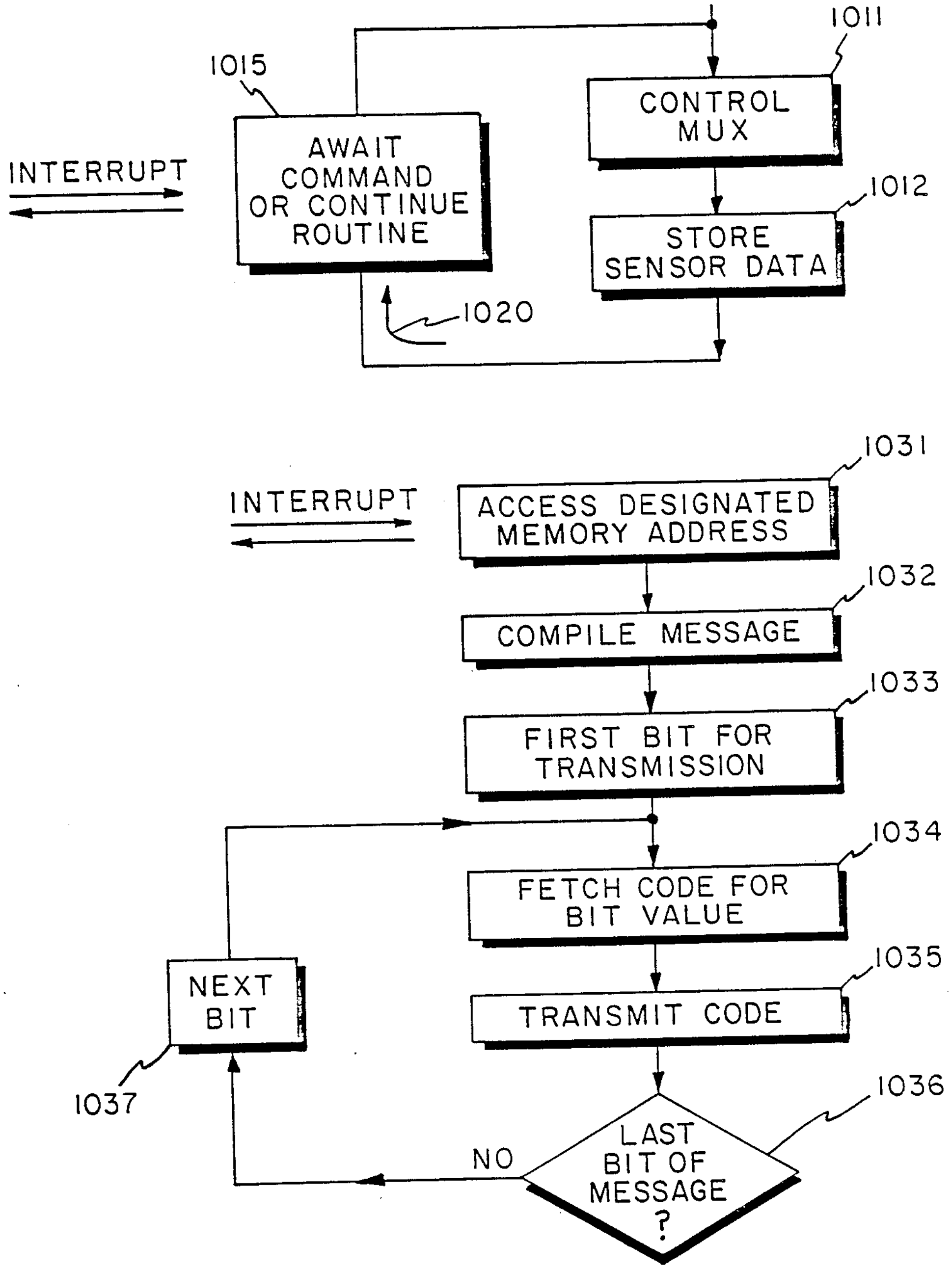
FIG. 10 is a flow diagram of a routine for programming of the downhole processor.

Referring to FIG. 10, there is shown a flow diagram of the routine for the downhole processor. It will be understood that techniques for collection and transmission of data are known in the art, and those portions hereof which do not, per se, relate to the invention will be described in general terms, or understood as being in accordance with known principles.

The block 1011 represents the control of multiplexer 221 (FIG. 2) to sample the outputs of the sensors 210 in accordance with either a predetermined routine or commands from uphole. The block 1012 represents the storage of the data downhole, and the loop 1020, including interrupt control and the block 1015, represents the continuous monitoring of sensor data. Sharing of attention from the processor can be in accordance with a predetermined priority basis, as is known in the art.

In the next portion of the FIG. 10 routine, the block 1031 represents the accessing of memory to obtain the appropriate stored information to be sent uphole. Again, the selection of data to be transmitted can be in accordance with a predetermined routine or can be controlled from uphole. Also, it will be understood that in certain modes of operation, the data from a particular sensor or sensors may be transmitted simultaneously with its acquisition and storage, although typically the data rate associated with downhole storage will be higher than the transmission data rate, and storage from multiple sensors can be implemented without compromising the fastest available uphole transmission. Also, the storage of critical data downhole may provide a backup, for later retrieval, in the event of a failure in the transmission link or system. The information retrieved from storage is compiled into a message, in accordance with the particular format being used (block 1032). The first data bit of the message to be transmitted is considered (block 1033), and the spread-spectrum code for the bit (i.e. the 63 chip code for a "1", or the complementary 63 chip code for a "0", as previously described) is fetched from memory, and transmitted, as represented by the blocks 1034 and 1035. The codes to be used can be stored, for example, in random access memory associated or in programmable read-only memory associated with the processor 250. Inquiry is made (diamond 1036) as to whether or not the last bit of the message has been transmitted. If not, the next bit is considered (block 1037), and the loop 1039 continues until the entire message has been transmitted.

Figure 11:
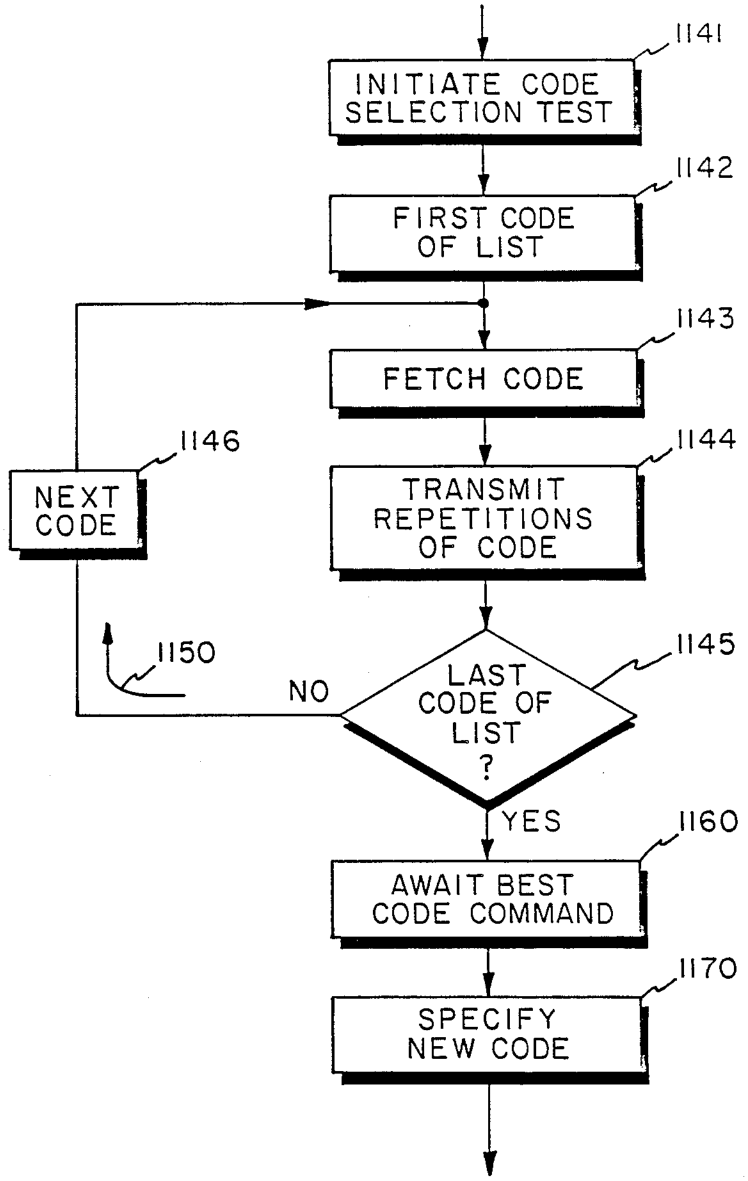
FIG. 11 is another routine for programming the downhole processor for an adaptive code selection test sequence.

As previously described, the spread-sprectrum code used can be modified, under control from the surface, after a test sequence during which a repertoire of the available spread-spectrum codes are transmitted to the surface. After selection, at the surface, of the particular spread-spectrum code which exhibits the best noise immunity, a control signal is sent from the surface to designate the spread-sprectrum code to be utilized until the next test sequence. The routine is illustrated in FIG. 11, wherein the block 1141 represents initiation of the code selection test routine upon receipt of a command from the surface. The block 1142 is entered, this block representing the selection of the first code of the list for transmission. The block 1143 represents the fetching of the current code, and the block 1144 represents the transmission of a predetermined number of repetitions of the code. Inquiry is then made (diamond 1145) as to whether or not the last code of the list has been transmitted. If not, the code index is incremented (block 1146), the block 1143 is reentered, and the loop 1150 is continued until all codes have been sent. The command designating the best mode is then awaited (block 1160), and when it is received, the new code is specified (block 1170). Until a new code is specified, communications between uphole and downhole, in either direction, would use the currently specified code. [The downhole routine for decoding messages from uphole can be the same as the one used uphole, and described herein below in conjunction with the routine of FIG. 12.]

It will be understood that the downhole processor is further programmed to achieve further routine functions, such as sending synchronizing signals to synchronize the uphole clock, sending signals indicative of the status of downhole circuits, power, etc.

Figure 12:
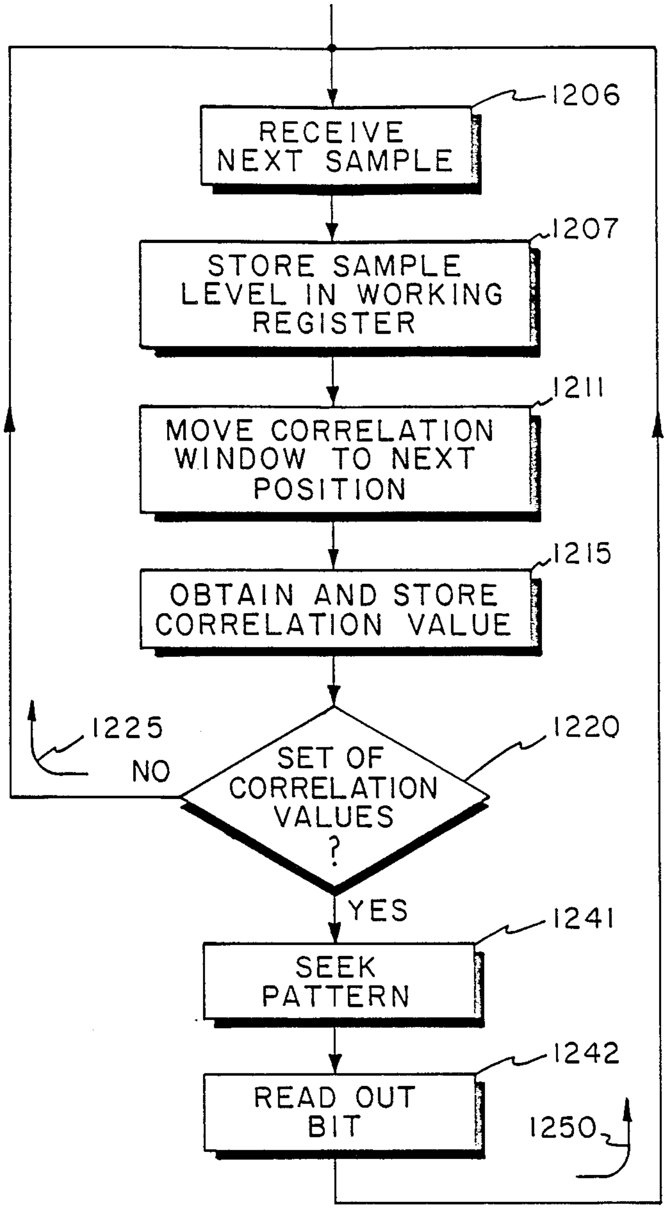
FIG. 12 is a flow diagram of a routine for programming the uphole processor for decoding the spread-spectrum coded information sent from downhole.

Referring to FIG. 12, there is shown a flow diagram of the routine for programming the processor 450 of the uphole subsystem (FIG. 4) for decoding the spread spectrum coded information sent from downhole. The correlation process can performed using either analog or digital technique, and reference can be made to the above noted publications for details of the correlation process. In the present digital processing, the next sampled level is received and stored in a register (e.g., in RAM) at the next address, as represented by the blocks 1206 and 1207. The correlation window, which is an overlay of the spread-spectrum code, is then moved to the next position (block 1211), the values at each chip position are multiplied, and the results over the window are added, to obtain a correlation value for the particular window position, these functions being represented by the block 1215. After storage of the computed value, inquiry is made (diamond 1220) as to whether or not a predetermined number of correlation values have been stored. If not, block 1206 is reentered, further sample values are obtained, and further correlation values computed and stored (loop 1225). The pattern of peaks is then sought, as represented by the block 1241. Numerically, this would correspond to peaks having positive or negative values greater than a predetermined magnitude. The bit values ("1" or "0"), depending upon the polarities of the peaks, are then read out (block 1242), and the routine is repeated (loop 1250) in looking for the next bit.

Figure 13:
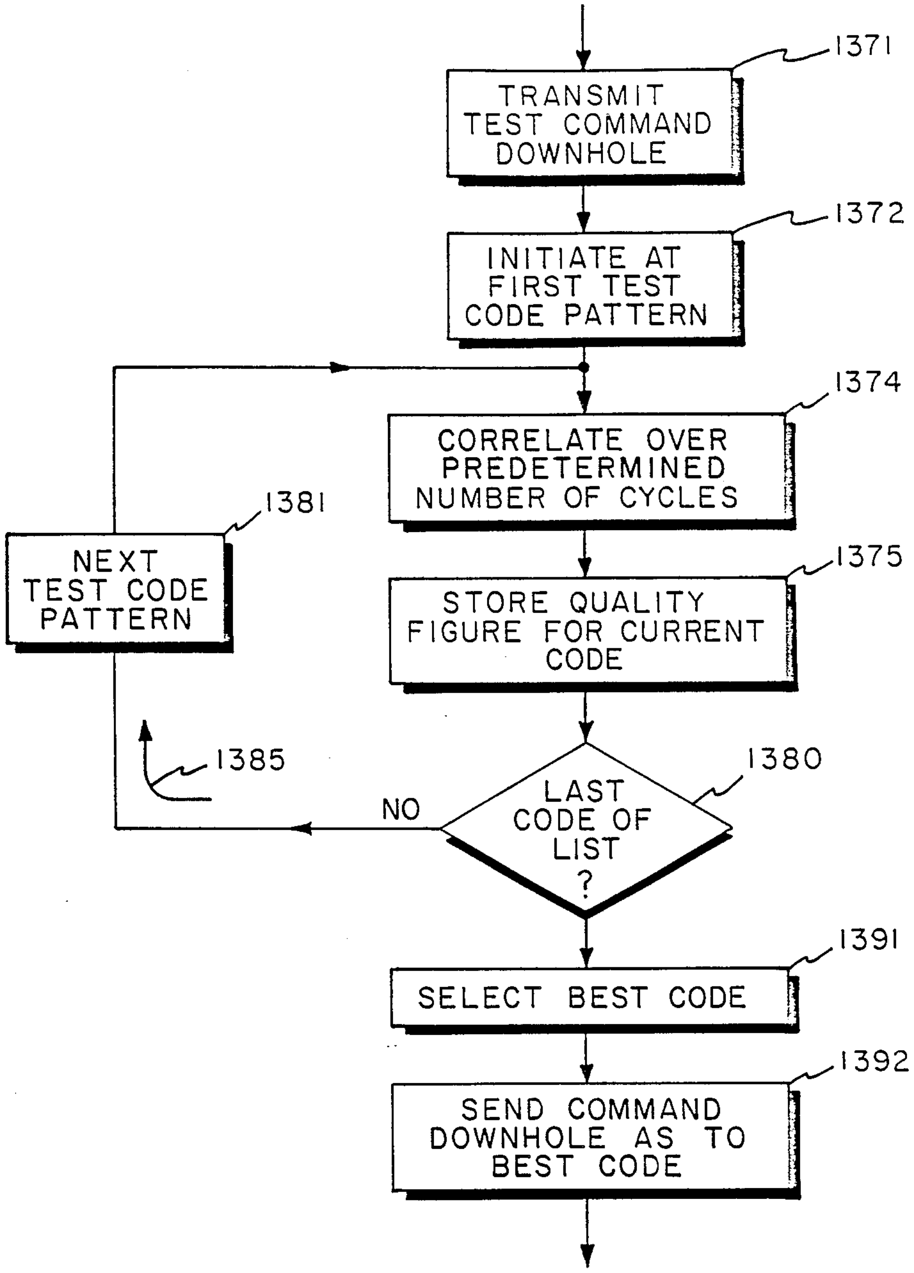
FIG. 13 is a flow diagram of another routine for the uphole processor, pertaining to the adaptive code modification.

FIG. 13 illustrates the routine for the processor uphole in testing the repertoire or list of possible codes to be used, and selection of one of the particular codes for use during the subsequent time period or during a particular condition. The block 1371 represents the transmitting of the command to initiate the test. An index indicating the first test code pattern to be received is initiated, as represented by block 1372. Correlation is then performed over a predetermined number of cycles (block 1374); i.e., the predetermined number of cycles of the test pattern that are transmitted from downhole. A quality figure obtained for the correlation (e.g. by determining the strength of the correlation peaks, together with absence of lost signals) is stored (block 1375), and inquiry is made (diamond 1380) as to whether or not the last code of the list has been received. If not, the test code pattern index is incremented (block 1381), and the loop 1385 is continued until a quality figure is obtained for each code of the list. The code having the best performance is then selected (block 1391), and a command is sent downhole to use this selected code for subsequent transmission, as represented by the block 1392.

During operations such as stimulation and testing, the tubing is subjected to mechanical forces that can result in contacts between the tubing and casing, which can be viewed as shorts in the transmission line. In the present invention, clamped-on tubing isolators are used to protect against such shorts. Rubber drill collar protectors could be used for this purpose, but plastic protectors would have the advantage of lower cost. The stresses to which tubing is subjected have been previously studied (see e.g. "Basic Fluid And Pressure Forces On Oilwell Tubulars", D. J. Hammerlindl, JPT, 1980; and "Helical Bucking Of Tubing Sealed In Packers", A. Lubinski, Petroleum Transactions, 1961). Compressive stresses that can cause buckling of the tubing are highest at the bottom of the well. Accordingly, the tubing protectors should preferably be spaced closer together as the bottom of the well is approached.

Notwithstanding the use of substantially non-conductive fluid and of insulating tubing protectors, under certain conditions, shorts may occur, and this is considered in the following analysis.

Figure 14:
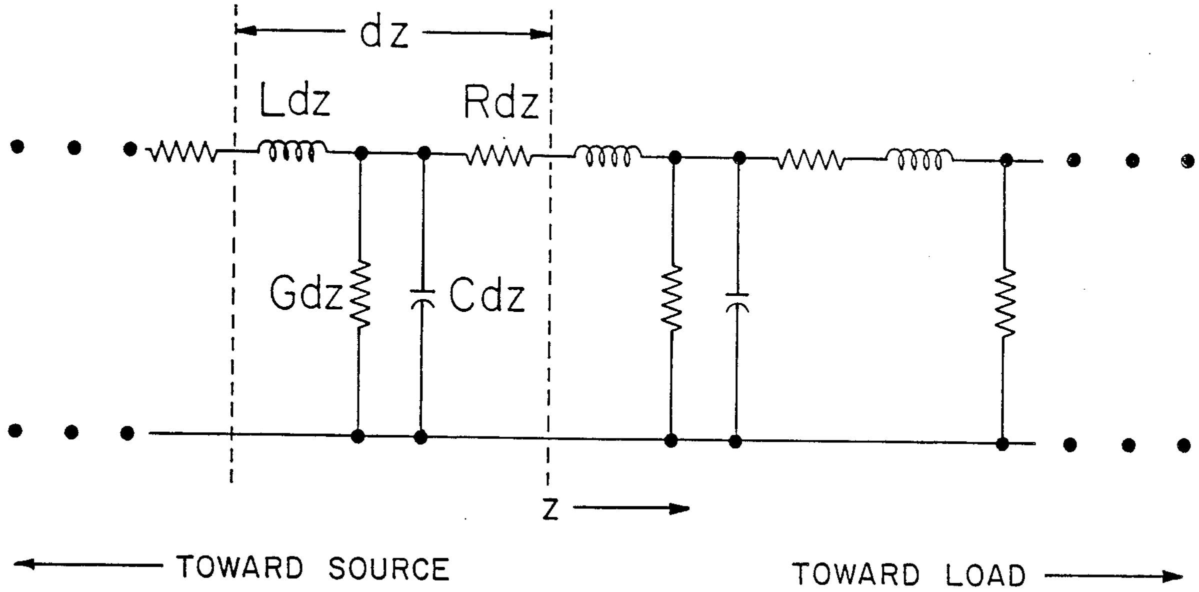
FIG. 14 is a schematic of a differential lumped circuit, setting forth model components of the system.

The characteristics of the of the coaxial transmission line are considered as being uniformly distributed along the line. The theoretical development of electromagnetic wave propagation along the transmission line can be approached by a lumped differential treatment, wherein the electromagnetic properties of the line for a differential length dz are "lumped" or assumed to exist as point elements connected by perfectly conductive segments. FIG. 14 shows a schematic of the differential lumped circuit and sets forth model components of the system, as follows: the series resistance per unit length of the combined inner and outer conductors, R; the series self-inductance per unit length of the conductors, L; the shunt conductance per unit length afforded by the annular fluid, G; and the shunt capacitance per unit length between the conductors, C. The differential equations and their solutions are well known (see, e.g., "Electromagnetic Concepts And Applications", Skitek et al. Prentice Hall, 1982) and can be represented in terms of the characteristic Impedance $Z_O$, the propagation constant $\gamma$, and the load impedance $Z_L$. The transmission line characteristics, $Z_O$ and $\gamma$, are defined as follows:

$$Z_O \equiv (Z/Y)^{\frac{1}{2}}, \tag{1}$$

and $$\gamma \equiv (ZY)^{\frac{1}{2}} \tag{2}$$

where $$Z = \text{series impedance/unit length} = R + j\omega L,$$

and $$Y = \text{shunt admittance/unit length} = G + j\omega C.$$

$\omega$ is the angular frequency in radians per sec, and is equal to $2\pi f$, where f is the frequency in Hz. [Since $Z_O$ and $\gamma$ are functions of $\omega$, the equations which follow will also be, although specific indications of that functionality will only occasionally be made.]

Figure 15:
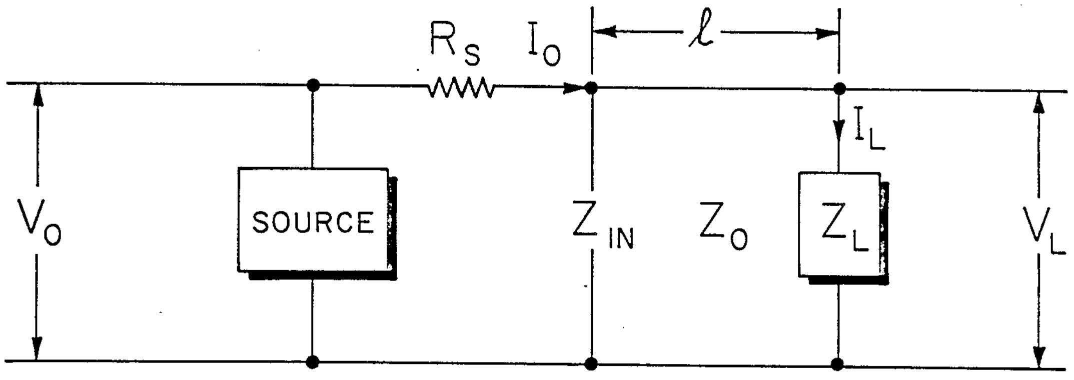
FIG. 15 is a schematic diagram of a transmission line model.

FIG. 15 schematically shows the transmission line voltage and current locations and introduces the input impedance, $Z_{IN}$, and a source resistance, $R_S$. The input impedance is related to the line parameters and the load as follows:

$$Z_{IN} = Z_O(Z_L + Z_O \tan h\gamma L)/(Z_L + \tan h\gamma L), \tag{3}$$

where L is the length of the transmission line. The respective load-to-source voltage and current ratios for FIG. 15 are $$V_L/V_O = [Z_{IN}/(R_S + Z_{IN})]\cos h\gamma L - Z_O/(R_S + Z_{IN})]\sin h\gamma L \tag{4}$$

and $$I_L/I_O = \cos h\gamma L - (Z_{IN}/Z_O)\sin h\gamma L. \tag{5}$$

Figure 16:
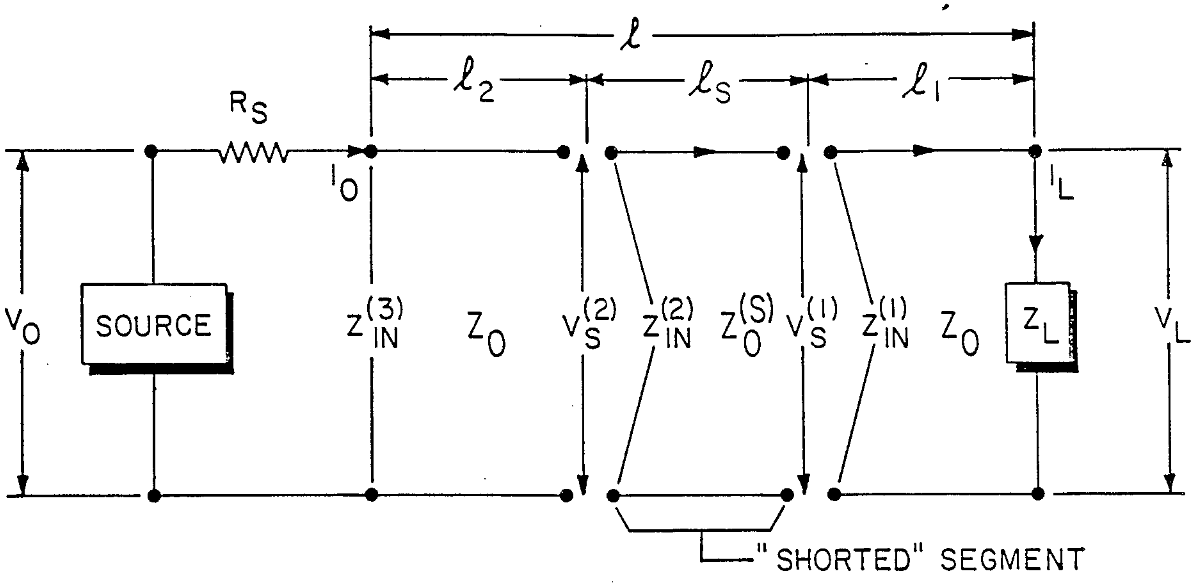
FIG. 16 is a schematic diagram of another transmission line model, with a shorted section.

FIG. 16 schematically shows the insertion of a shorted section into the transmission line, such as one might expect where either a section of the tubing touches the casing or where a section of the annular fluid is highly conductive, the latter occurring, for example, if formation brine has leaked into the system. The above ratios (4) are calculated for each section and cascaded for the final ratios. In FIG. 16, voltage ratios $V_L/V_S^{(1)}$, $V_S^{(1)}/V_S^{(2)}$ and $V_S^{(2)}/V_O$ satisfy relations similar to (4), where $R_S = 0$ for the first two ratios, $Z_L = Z_{IN}^{(1)}$ for the second ratio, and $Z_L = Z_{IN}^{(2)}$ for the third ratio. For the shorted section, i.e., $V_S^{(2)}/V_S^{(1)}$, $Z_O^{(S)}$ must be substituted for $Z_O$ and $\gamma^{(S)}$ for $\gamma$. The appropriate lengths ($L_1$, $L_S$ and $L_2$) must be substituted for L. Similar arguments apply to the electrical current ratios. $V_L/V_S$ can be expressed as $$V_L/V_O = [V_L/V_S^{(1)}]\cdot[V_S^{(1)}/V_S^{(2)}]\cdot[V_S^{(2)}/V_O], \tag{6}$$

and similarly for $I_L/I_O$. Equations (4) and (6) provide the necessary relationships to calculate the voltage impulse response of the system. Since $V_O(\omega) = 1$ for all $\omega$ for an input impulse, then $V_L V_O = V_L$, the ratio itself representing the voltage impulse response at the load.

The power response resulting from an input voltage impulse is obtained from the dot product of the voltage and current at the load, viz., $V_L \cdot I_L$. Referring to FIGS. 15 and 16, $$I_O(\omega) = [R_S + Z_{IN}^{(3)}(\omega)]^{-1} V_O(\omega) = [R_S + Z_{IN}^{(3)}(\omega)]^{-1}.$$

Then, using this result and the voltage and current ratios derivable from relations (4) and (6), the power impulse response becomes $$P_L = V_L \cdot I_L = (V_L/V_O)\cdot\{[I_L/I_O]\cdot[R_S + Z_{IN}^{(3)}]^{-1}\}. \tag{7}$$

Figure 17:
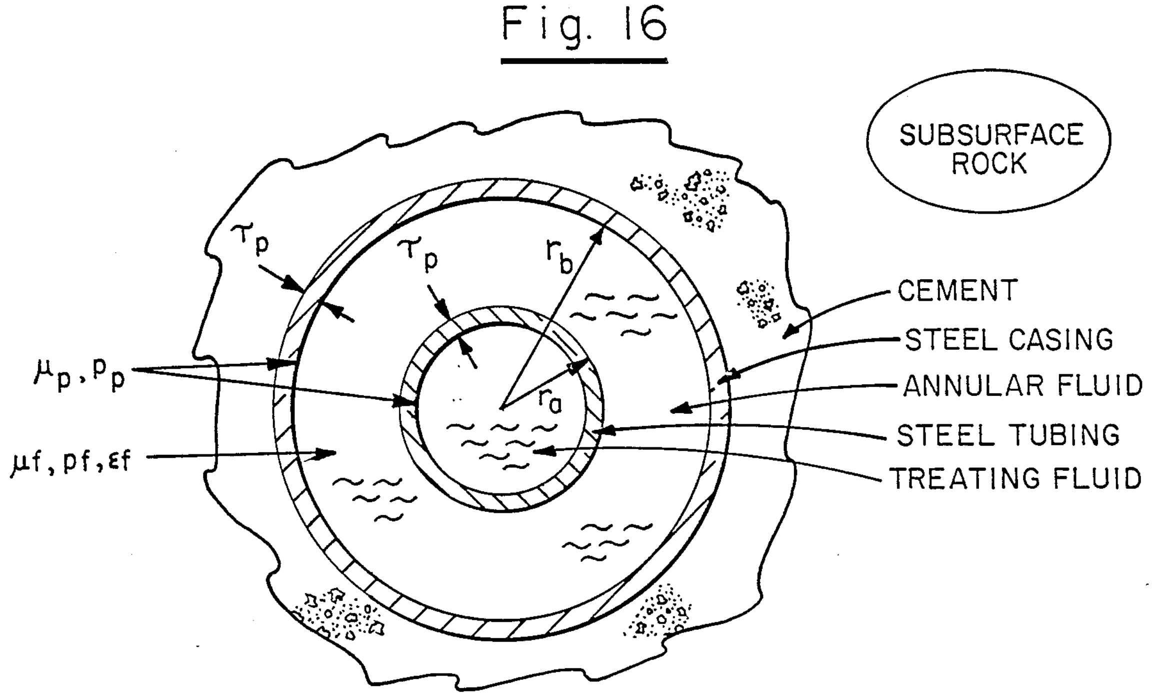
FIG. 17 is a schematic of parameterization of a coaxial pipe system, as seen from an end view.

The subject transmission line can be analyzed to obtain expressions for R, L, G, and C as required by (4) for the characteristic impedance $Z_O$ and propagation constant $\gamma$. Referring to FIG. 17, in what follows, the assumption is made that the fluid inside the inner pipe and the outside environment, typically consisting of a thin inner coaxial cement layer and an outer layer of horizontally stratified earth, can be ignored (i.e., treated as empty space). The magnetic field exists primarily between the two conductors; and, due to the "skin effect", the current density will exponentially decay from the outer edge of the inner conductor and the inner edge of the outer conductor.

The total weighted current desnities in the inner and outer conductors can, for purposes of specifying the series resistance term R, effectively be replaced by a unit-weighted current density of thickness $\delta = (\pi f u_p/\rho_p)^{-\frac{1}{2}}$, where $\delta$, $u_p$, and $\rho_p$, are respectively the skin depth, permeability, and resistivity in the pipe (casing or tubing). Assuming that $\delta$ is much smaller than the thickness of the pipe, the combined resistance/unit length for the inner and outer conductors (tubing and casing, respectively) would be $$R = (\rho p/2\pi ra) + (\rho_p/2\pi r_b); \tag{8}$$

substituting for and algebraically manipulating leads to $$R = (\tfrac{1}{2})(f u_p \rho_p \pi)^{\frac{1}{2}}(r_a^{-1} + r_b^{-1}). \tag{9}$$

Similarly, the shunt conductance/unit length between the inner and outer pipes afforded by the annular fluid is given by $$G = 2\pi[(r_a + r_b)/2]/[\rho_f(r_b - r_a)]. \tag{10}$$

Of the four major properties of the coaxial transmission system, this is the only one which is not frequency dependent.

The remaining two properties can easily be derived from geometric considerations (e.g., Skitek et al. and Marshall, supra). They are:

$$L = (u_f/2\pi)\ 1n(r_b/r_a) + u_p/\delta\ (1/r_b + 1/r_a)/4\pi, \tag{11}$$

and $$C = 2\pi\epsilon_f/1n(r_b/r_a), \tag{12}$$

where $u_f$ and $\epsilon_f$ are respectively the permeability and permittivity of the fluid. In S.I. (Systeme International) units, the variables in the previous four equations have the following units: R(ohms/m), G(mhos/m), L(henries/m), C(farads/m), p(ohm−m) u(tesla−m/amp), r(m), and (coulomb²/newton−m²). For purposes of the table, it is convenient to define the unitless relative permeability $k_m$ such that $$u = k_m u_O, \qquad (13)$$

where $$\mu_0 = \text{permeability of free space} \equiv 4\pi \times 10^{-7}\ (T \cdot m/A),$$

and the unitless dielectric constant K such that $$\epsilon = K\epsilon_O,$$

where $$\epsilon_0 = \text{permittivity of free space} = 8.85 \times 10^{-12}\ (C^2/N \cdot m^2).$$

Since the annular fluid is nonmagnetic, it is permissible to assume that $u_f = u_O$.

Table 1 shows a typical tabular form of voltage and power ratios, obtained using the above relationships, for the coaxial system arrangement in a test well, for a 1500 m depth and diesel in the annulus. As can be seen, there is little signal voltage attenuation by the coaxial system. At 500 Hz, the signal voltage is attenuated by only −0.5 dB, increasing to −1.3 dB at 1,900 Hz. Table 2 shows a similar table for a short 80 m coaxial system with brine ($\rho_f = 1$ ohm−m) in the annulus. The attenuation at 500 Hz in this case is 165.7 dB, so communication is possible only over relatively short distances.

TABLE 1

PIPE RADII (INCHES) = 2.500000 1.437500
RELATIVE PERMEABILITY OF PIPE = 2000.000
DIELECTRIC CONSTANT OF ANNULAR FLUID = 80.00000
PIPE RESISTIVITY (OHM*M) = 1.0000000E-07
ANNULAR FLUID RESISTIVITY (OHM*M) = 1.0000000+09
PIPE LENGTH (M) = 1500.000
SOURCE RESISTANCE (OHMS) = 0.1000000
D.C. LOAD IMPEDANCE (OHMS) = (100.0000,9.9999998E-03)
FREQUENCY PARAM. (HZ,HZ,#) = 0 100.0000
D.C. PIPE RESISTANCE(OHMS) FOR .5" THKNS. = 8.1086218E-02
FREQUENCY (HZ); WAVELENGTH (M); CHARACTERISTIC (RE,IM ,ABS) IMPEDANCE & ABSOLUTE SOURCE IMPEDANCE IN OHMS:
LOAD-TO-SOURCE VOLTAGE (VLV0) AND POWER (PLP0) RATIOS IN dB:

| | | | | | | |
|---|---|---|---|---|---|---|
| * F, LAMBDA; Z0R, Z0I, Z0, ZIN: | 0.0 | 999999 | 68.14 | 0.00 | 68.14 | 100.01 |
| VLV0, PLP0: | | | 0.0 | | | 0.0 |
| F, LAMBDA; Z0R, Z0I, Z0, ZIN: | 100.0 | 88509 | | 14.09-13.56 | 19.55 | 84.37 |
| VLVO, PLPO: | | | −0.3 | | | −0.2 |
| F, LAMBDA; Z0R, Z0I, Z0, ZIN: | 200.0 | 52207 | | 11.93-11.32 | 16.44 | 60.40 |
| VLV0, PLP0: | | | −0.3 | | | −0.3 |
| F, LAMBDA; Z0R, Z0I, Z0, ZIN: | 300.0 | 38291 | | 10.84-10.17 | 14.86 | 44.81 |
| VLV0, PLP0: | | | −0.4 | | | −0.5 |
| F, LAMBDA; Z0R, Z0I, Z0, ZIN: | 400.0 | 30708 | | 10.13-9.42 | 13.84 | 35.08 |
| VLV0, PLP0: | | | −0.4 | | | −0.9 |
| F, LAMBDA; Z0R, Z0I, Z0, ZIN: | 500.0 | 25865 | | 9.62-8.87 | 13.09 | 28.63 |
| VLV0, PLP0: | | | −0.5 | | | −1.3 |
| F, LAMBDA; Z0R, Z0I, Z0, ZIN: | 600.0 | 22472 | | 9.23-8.45 | 12.51 | 24.10 |
| VLV0, PLP0: | | | −0.5 | | | −1.9 |
| F, LAMBDA; Z0R, Z0I, Z0, ZIN: | 700.0 | 19947 | | 8.91-8.10 | 12.04 | 20.77 |
| VLV0, PLP0: | | | −0.5 | | | −2.6 |
| F, LAMBDA; Z0R, Z0I, Z0, ZIN: | 800.0 | 17987 | | 8.65-7.81 | 11.65 | 18.23 |
| VLV0, PLP0: | | | −0.5 | | | −3.4 |
| F, LAMBDA; Z0R, Z0I, Z0, ZIN: | 900.0 | 16415 | | 8.42-7.56 | 11.32 | 16.24 |
| VLV0, PLP0: | | | −0.5 | | | −4.2 |
| F, LAMBDA; Z0R, Z0I, Z0, ZIN: | 1000.0 | 15124 | | 8.23-7.34 | 11.03 | 14.64 |
| VLV0, PLP0: | | | −0.5 | | | −5.1 |
| F, LAMBDA; Z0R, Z0I, Z0, ZIN: | 1100.0 | 14042 | | 8.06-7.15 | 10.77 | 13.35 |
| VLV0, PLP0: | | | −0.6 | | | −6.0 |
| F, LAMBDA; Z0R, Z0I, Z0, ZIN: | 1200.0 | 13120 | | 7.90-6.98 | 10.54 | 12.28 |
| VLV0, PLP0: | | | −0.6 | | | −6.9 |
| F, LAMBDA; Z0R, Z0I, Z0, ZIN: | 1300.0 | 12324 | | 7.77-6.82 | 10.34 | 11.40 |
| VLV0, PLP0: | | | −0.6 | | | −7.9 |
| F, LAMBDA; Z0R, Z0I, Z0, ZIN: | 1400.0 | 11629 | | 7.64-6.68 | 10.15 | 10.66 |
| VLV0, PLP0: | | | −0.7 | | | −8.8 |

*EFFECTIVE SKIN THICKNESS = 0.5 IN.

TABLE 2

PIPE RADII (INCHES) = 2.500000 1.437500
RELATIVE PERMEABILITY OF PIPE = 2000.000
DIELECTRIC CONSTANT OF ANNULAR FLUID = 80.00000
PIPE RESISTIVITY (OHM*M) = 1.0000000E-07
ANNULAR FLUID RESISTIVITY (OHM*M) = 1.000000
PIPE LENGTH (M) = 80.00000
SOURCE RESISTANCE (OHMS) = 0.1000000
D.C. LOAD IMPEDANCE (OHMS) = (100.0000,9.9999998E-03)
FREQUENCY PARAM. (HZ,HZ,#) = 0 100.0000
D.C. PIPE RESISTANCE(OHMS) FOR .5" THKNS. = 4.3245982E-03
FREQUENCY (HZ); WAVELENGTH (M); CHARACTERISTIC (RE,IM ,ABS) IMPEDANCE & ABSOLUTE SOURCE IMPEDANCE IN OHMS:
LOAD-TO-SOURCE VOLTAGE (VLV0) AND POWER (PLP0) RATIOS IN dB:

| | | | | | | |
|---|---|---|---|---|---|---|
| * F, LAMBDA; Z0R, Z0I, Z0, ZIN: | 0.0 | 999999 | 0.00 | 0.00 | 0.00 | 0.10 |
| VLV0, PLP0: | | | −44.8 | | | −74.7 |
| F, LAMBDA; Z0R, Z0I, Z0, ZIN: | 100.0 | 2326 | 0.01 | 0.00 | 0.01 | 0.11 |
| VLV0, PLP0: | | | −117.0 | | | −146.5 |
| F, LAMBDA; Z0R, Z0I, Z0, ZIN: | 200.0 | 1383 | 0.02 | 0.00 | 0.02 | 0.12 |
| VLV0, PLP0: | | | −135.4 | | | −164.8 |
| F, LAMBDA; Z0R, Z0I, Z0, ZIN: | 300.0 | 1020 | 0.02 | 0.00 | 0.02 | 0.12 |
| VLV0, PLP0: | | | −147.9 | | | −177.3 |
| F, LAMBDA; Z0R, Z0I, Z0, ZIN: | 400.0 | 822 | 0.02 | 0.00 | 0.02 | 0.12 |
| VLV0, PLP0: | | | −157.6 | | | −187.1 |
| F, LAMBDA; Z0R, Z0I, Z0, ZIN: | 500.0 | 696 | 0.02 | 0.00 | 0.02 | 0.12 |
| VLV0, PLP0: | | | −165.7 | | | −195.3 |
| F, LAMBDA; Z0R, Z0I, Z0, ZIN: | 600.0 | 607 | 0.02 | 0.00 | 0.02 | 0.12 |
| VLV0, PLP0: | | | −172.6 | | | −202.4 |
| F, LAMBDA; Z0R, Z0I, Z0, ZIN: | 700.0 | 541 | 0.02 | 0.00 | 0.02 | 0.12 |
| VLV0, PLP0: | | | −178.8 | | | −208.7 |
| F, LAMBDA; Z0R, Z0I, Z0, ZIN: | 800.0 | 489 | 0.02 | 0.00 | 0.02 | 0.12 |
| VLV0, PLP0: | | | −184.3 | | | −214.4 |
| F, LAMBDA; Z0R, Z0I, Z0, ZIN: | 900.0 | 448 | 0.02 | 0.00 | 0.02 | 0.12 |
| VLV0, PLP0: | | | −189.4 | | | −219.7 |
| F, LAMBDA; Z0R, Z0I, Z0, ZIN: | 1000.0 | 414 | 0.02 | 0.00 | 0.02 | 0.12 |
| VLV0, PLP0: | | | −194.0 | | | −224.6 |
| F, LAMBDA; Z0R, Z0I, Z0, ZIN: | 1100.0 | 385 | 0.02 | 0.00 | 0.02 | 0.12 |
| VLV0, PLP0: | | | −198.4 | | | −229.1 |
| F, LAMBDA; Z0R, Z0I, Z0, ZIN: | 1200.0 | 361 | 0.02 | 0.00 | 0.02 | 0.12 |
| VLV0, PLP0: | | | −202.4 | | | −233.4 |
| F, LAMBDA; Z0R, Z0I, Z0, ZIN: | 1300.0 | 340 | 0.02 | 0.00 | 0.02 | 0.12 |
| VLV0, PLP0: | | | −206.2 | | | −237.5 |
| F, LAMBDA; Z0R, Z0I, Z0, ZIN: | 1400.0 | 322 | 0.02 | 0.00 | 0.03 | 0.12 |
| VLV0, PLP0: | | | −209.8 | | | −241.4 |

*EFFECTIVE SKIN THICKNESS = 0.5 IN.

Figure 18:
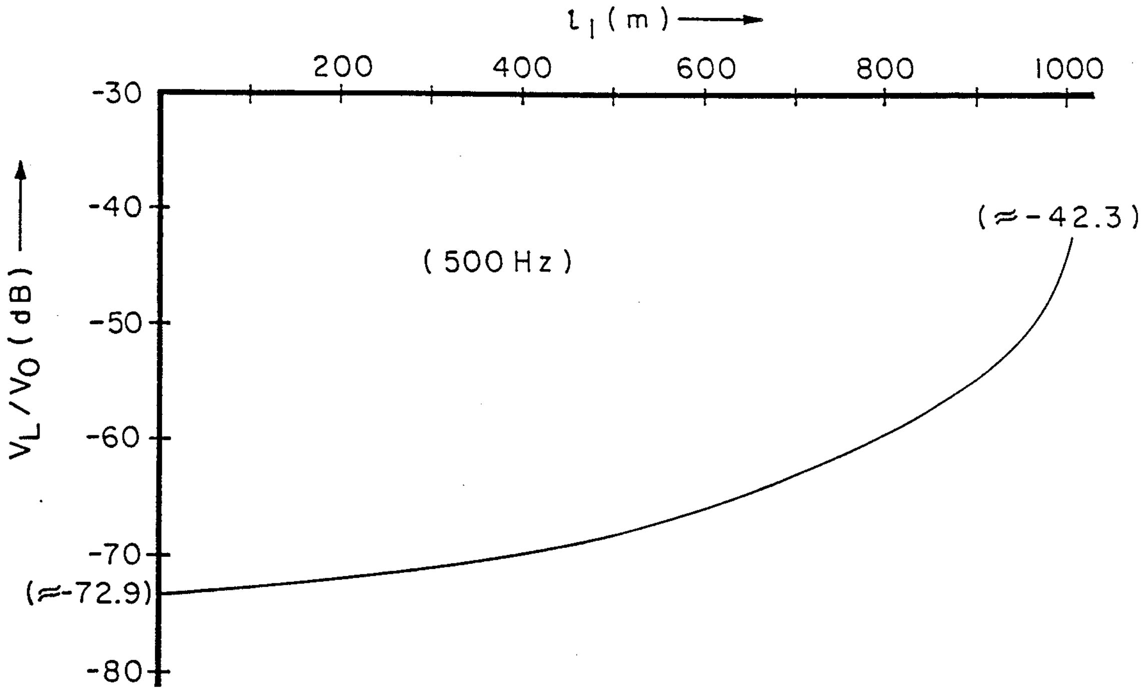
FIG. 18 shows the effects of a point short at various positions along a transmission line.
Figure 19:
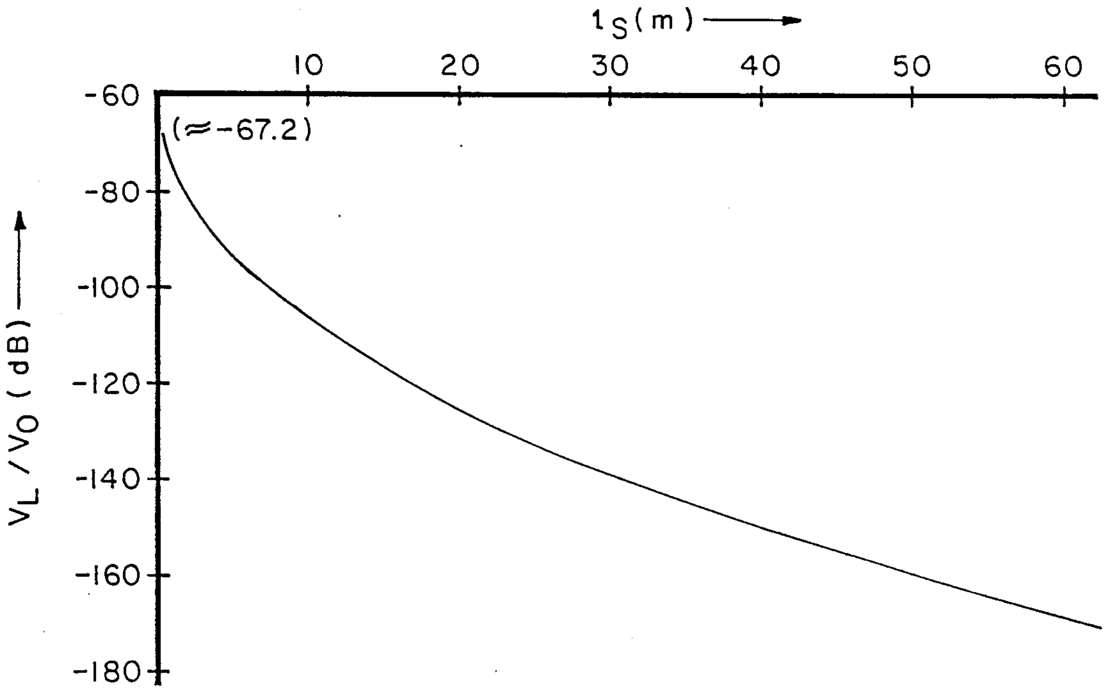
FIG. 19 shows the effects of a short of various lengths.

The tabulated data indicate the relative effects of an electrical short at various positions along the transmission line and for various lengths of the tubing and casing touching to create the shorted condition. FIG. 18 shows the effects of a point short of 1 milliohm at various positions along a 1000 m transmission line at 500 Hz. The Figure shows that a short near the transmitter, i.e., near the bottom of the well, has a much less severe attenuating effect on the signal voltage. Due to the distribution of stress along the tubing in normal operations, shorting is much more likely to happen nearer the bottom. FIG. 19 shows the effects of the same 1 milliohm short as it is distributed over various lengths of the coaxial system. This Figure indicates that a "point" short is the least catastrophic, with the loss of signal voltage increasing dramatically as the shorted length of tubing-to-casing increases, although the total short value has been kept constant at 1 milliohm in this examle. Accordingly, it is seen that a short of limited extent, particularly near the bottom, is unlikely to prevent communication over the transmission link.

In accordance with a further feature of the invention, a technique is employed for improving reception of communicated signals in the presence of a periodic short in the transmission link, such as would be expected to be created by harmonic motion of the tubing during high-volume pumping of fluid through the tubing. If the motion is severe enough to cause the tubing to contact the casing (i.e., assuming that the protective collars are not spaced sufficiently close together, or fail), the signal transmitted during such contact may be severely attenuated. A demodulation technique can be employed to advantage at the receiving subsystem (uphole or downhole), depending on which subsystem is receiving) in recovering the coded information at the receiving subsystem. [With regard to demodulation in communication systems in general, see "Signals, Systems and Communication", B. Lathi, John Wiley & Sons, 1965.] In the present embodiment, a full-wave rectifier technique is employed. The received signals are processed to obtain their absolute value, and then low-pass filtered with a high cut-off at or below the carrier frequency. This low-pass filtering is effected herein by taking a running average. These operations yield the modulating function itself. Demodulation is then achieved by dividing the incoming signal by the derived modulating function. The result is similar to subjecting the signal to an automatic gain control which boosts the signals during the periods of attenuation.

Figure 20:
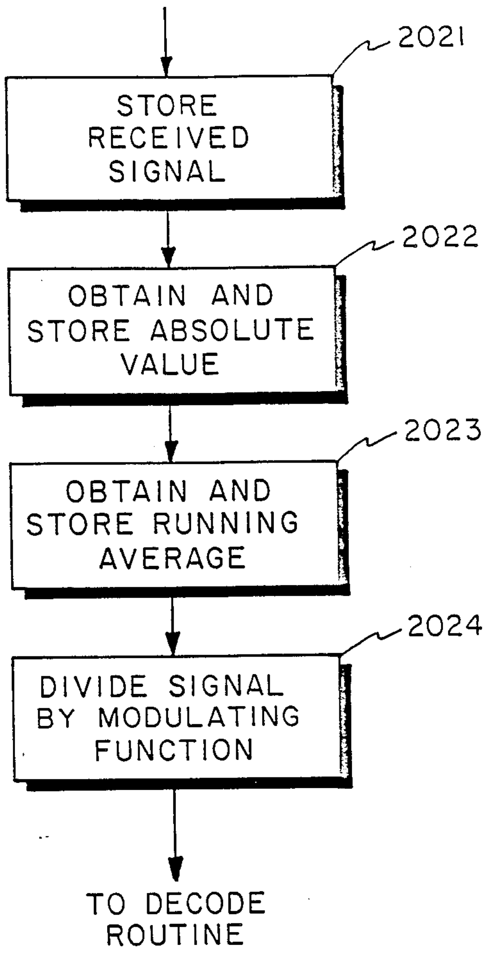
FIG. 20 is a flow diagram of a routine for demodulation in accordance with a feature of the invention.

The flow diagram of FIG. 20 illustrates the routine for the processor in the receiving subsystem. Block 2021 represents storage of the received signals, and the block 2022 represents obtainment and storage of the absolute value of the received signals. A running average is then computed (block 2023), and constitutes the modulation function. The received signal (previously stored) is then divided by the modulating function, as represented by the block 2024. The decoding routine can then be implemented, as previously described.

Figure 21:
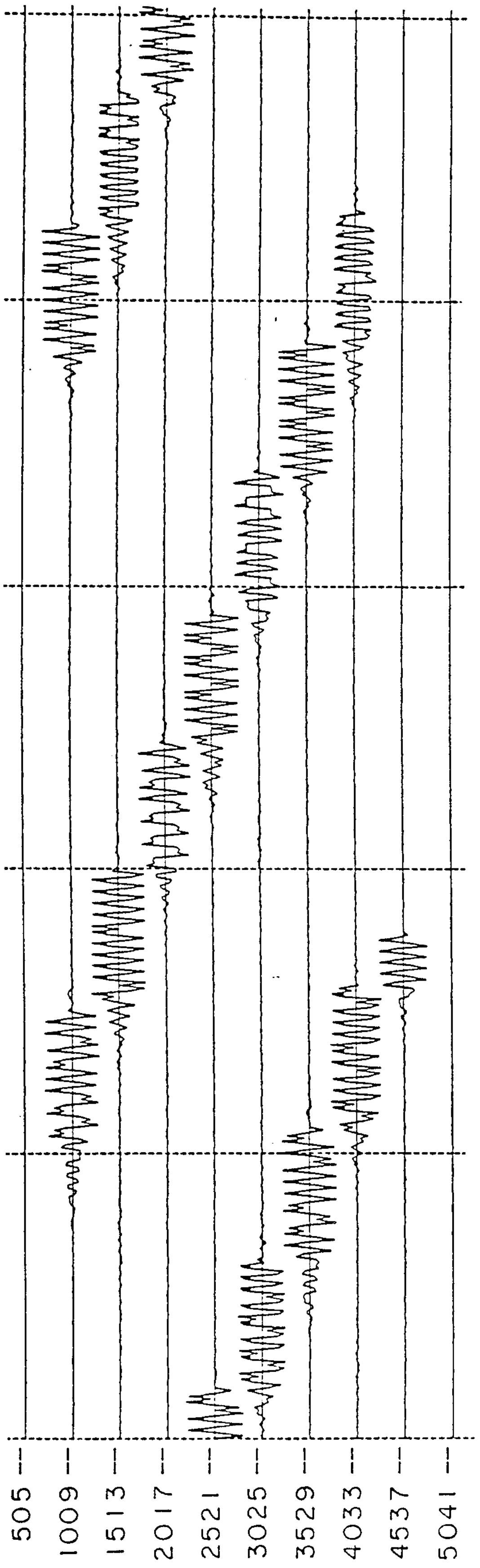
FIGS. 21–24 illustrate a sequence of pseudorandom codes sent and received during a condition of shorting, and show the effects of using a demodulation technique at the receiver.
Figure 22:
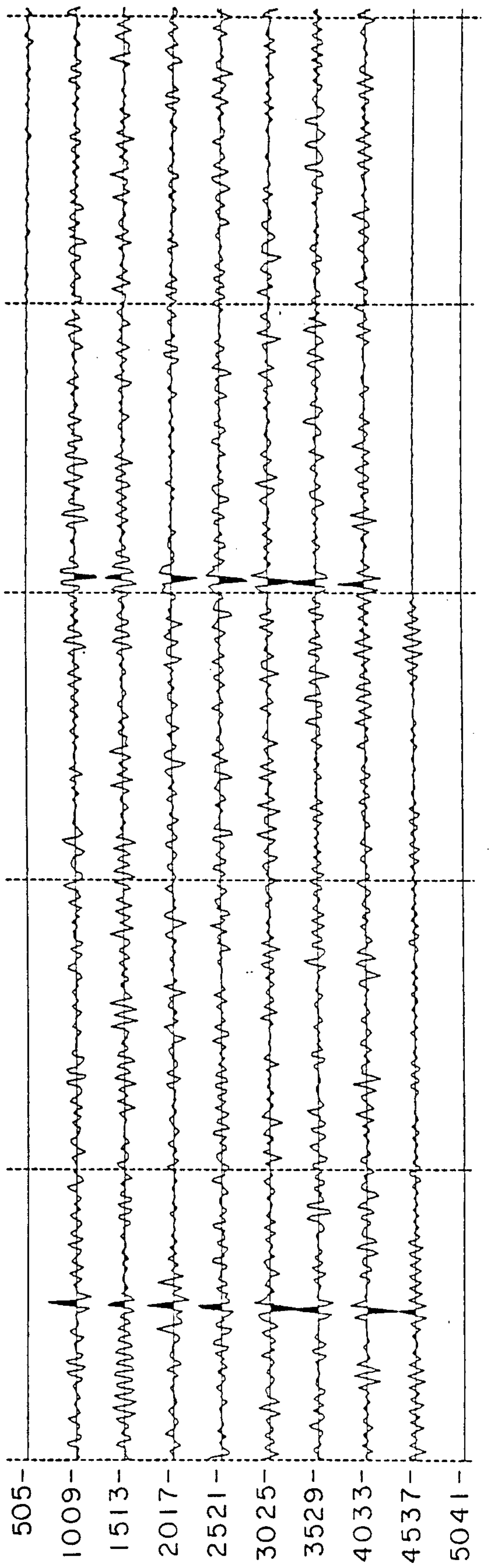
Figure 23:
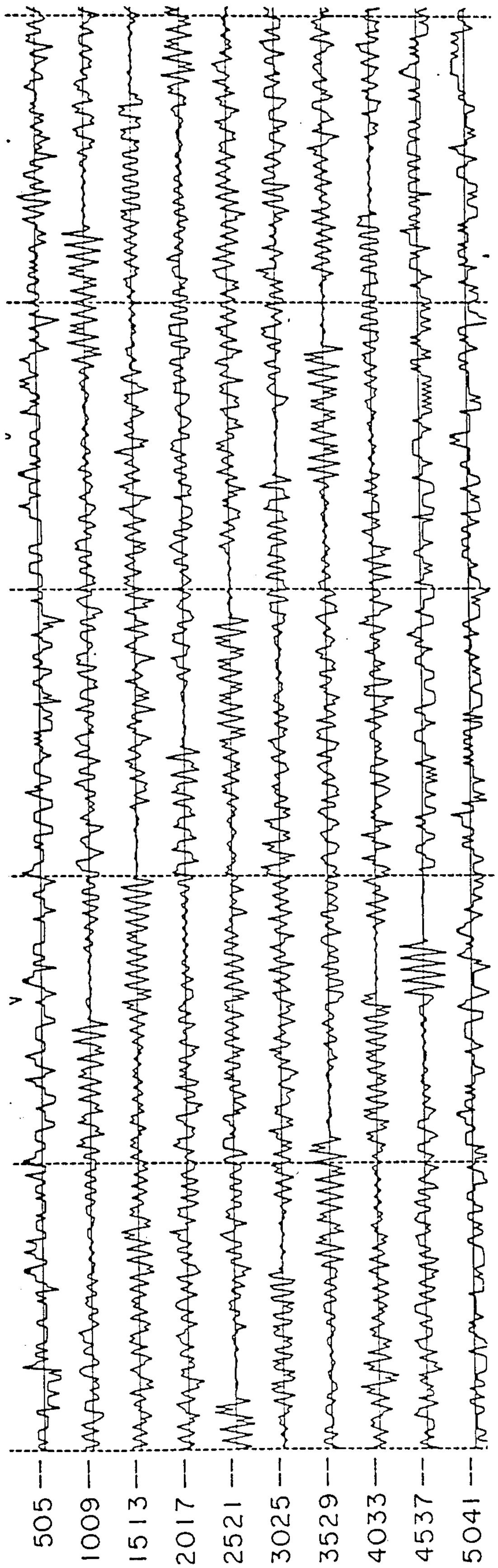
Figure 24:
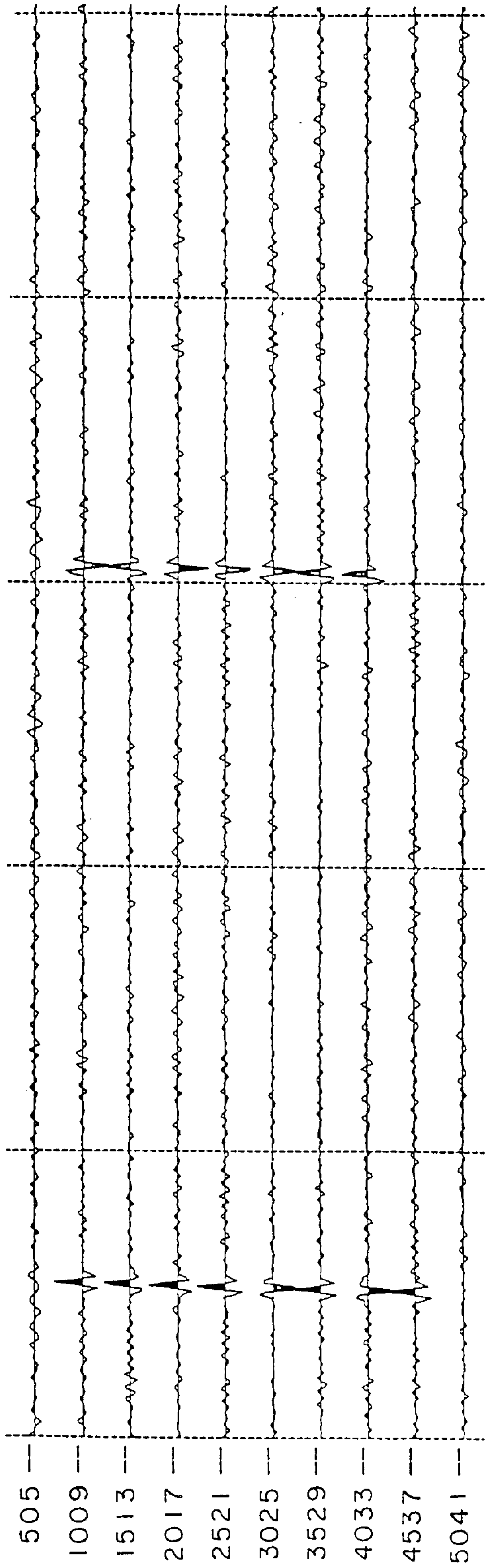

FIGS. 21–24 illustrate an example of the type of improvement that can be obtained using the demodulation technique. FIG. 21 illustrates an example of an otherwise clean received signal that has been modulated by electrical short circuit between the tubing and casing caused by tubing oscillations while pumping at ten barrels per minute. (Protective collars around the tubing were intentionally omitted during the test.) The generally periodic drastic signal attenuation is seen to be very distinct, and has a frequency in about the 6–20 Hz range. FIG. 22 shows the results of decoding the received data of FIG. 21, and it is seen that while the correlation procedure still exhibits the bits, some are hardly discernible. FIG. 23 illustrates the received data after the described type of demodulation processing, and FIG. 24 shows the results of decoding after the demodulation processing. Signal-to-noise ratio for the 15 decoded bits was substantially improved.

It will be understood that references to the surface of the earth may include the ocean surface, for example when the system is employed offshore. In such case, communication to a subsystem at ocean bottom may be useful, such as for communicating to or from valves, such as in a blowout protection mechanism.

The invention has been described with reference to particular preferred embodiments, but variations within the spirit and scope of the invention will occur to those skilled in the art. For example, it will be understood that additional communications subsystems can be employed at different positions on the tubing, so that there are three or more communications subsystems. Further, the invention also has applicability in a situation where a plurality of tubings are being utilized. Finally, it will be understood that in certain circumstances, e.g. when highly insulating fluid is employed in the annulus and where other conditions are favorable, the transmission frequency (and, accordingly, the data rate) can be increased, up to the order of about 1 MHz.

We claim:

1. For use in an earth borehole which is cased with an electrically conductive casing and has electrically conductive tubing extending through the casing and spaced from the casing; a communication system for communicating between downhole and the earth's surface, comprising:

a downhole communications subsystem mounted on said tubing, said subsystem including: a downhole toroidal antenna means concentric the tubing for coupling electromagnetic energy in a TEM mode to the annulus between said casing and tubing and a downhole receiver coupled to said downhole antenna means for coupling signals to said antenna means;

an uphole communications subsystem at the earth's surface, including: uphole antenna means and an uphole receiver, said uphole antenna means coupling electromagnetic energy in a TEM mode from said annulus to said receiver;

substantially non-conductive fluid in said annulus in at least the region of said downhole antenna means and above; and conductive means below said downhole communications subsystem for electrically coupling said tubing and casing.

2. The system as defined by claim 1, further comprising a packer mounted on said tubing below said downhole communications subsystem, said packer being operative to prevent incursion of conductive fluid into said annulus.

3. The system as defined by claim 2, wherein said conductive means comprises said packer, said packer being formed of a conductive material.

4. The system as defined by claim 3, wherein said downhole subsystem further includes means for sensing at least one downhole condition, and wherein the signals coupled to said downhole antenna means contain information representing the sensed downhole condition.

5. The system as defined by claim 4, further comprising means in said downhole subsystem for coding said information into a pseudorandom code, and means in said uphole subsystem for decoding said pseudorandom code.

6. The system as defined by claim 5, wherein said code is a pseudorandom sign-reversing code.

7. The system as defined by claim 2, wherein said uphole antenna means comprises a transformer having a winding coupled between the casing and the tubing.

8. The system as defined by claim 7, further comprising a multiplicity of spaced-apart protective collars on said tubing, said collars being formed of an insulating material.

9. The system as defined by claim 8, wherein said collars are spaced more closely together near the downhole communications subsystem.

10. The system as defined by claim 1, wherein said uphole antenna means comprises a transformer having a winding coupled between the casing and the tubing.

11. The system as defined by claim 1, further comprising a multiplicity of spaced-apart protective collars on said tubing, said collars being formed of an insulating material.

12. The system as defined by claim 11, wherein said collars are spaced more closely together near the downhole communications subsystem.

13. The system as defined by claim 1, wherein said downhole subsystem further includes means for sensing at least one downhole condition, and wherein the signals coupled to said downhole antenna means contain information representing the sensed downhole condition.

14. The subsystem as defined by claim 13, further comprising means in said downhole system for coding said information into a pseudorandom code, and means in said uphole subsystem for decoding said pseudorandom code.

15. The system as defined by claim 14, wherein said code is a pseudorandom sign-reversing code.

16. The system as defined by claim 1, wherein said downhole communications subsystem includes a downhole receiver coupled with said downhole antenna means, and wherein said uphole communications subsystem includes an uphole transmitter coupled with said uphole antenna means.

17. The system as defined by claim 16, wherein said downhole subsystem further includes means for sensing at least one downhole condition, and wherein the signals coupled to said downhole antenna means contain information representing the sensed downhole condition.

18. The system as defined by claim 17, further comprising means in said downhole subsystem for coding said information into a pseudorandom code, and means in said uphole subsystem for decoding said pseudorandom code.

19. The system as defined by claim 18, wherein said code is a pseudorandom sign-reversing code.

20. The system as defined by claim 19, wherein said uphole subsystem further includes means for generating control signals for controlling the downhole subsystem, and wherein said control signals are coupled to said uphole antenna means.

21. The system as defined by claim 20, further comprising means in said uphole system for coding signals into a pseudorandom code, and means in said downhole subsystem for decoding said pseudorandom code.

22. The system as defined by claim 21, wherein said code is a pseudorandom sign-reversing code.

23. The system as defined by claim 19, further comprising downhole actuating devices, and wherein said downhole subsystem further includes means for generating control signals for controlling said actuating devices, and wherein said uphole subsystem includes means for coupling signals to said uphole antenna means for running the downhole control signals.

24. The system as defined by claim 23, further comprising means in said uphole system for coding signals into a pseudorandom code, and means in said downhole subsystem for decoding said pseudorandom code.

25. The system as defined by claim 24, wherein said code is a pseudorandom sign-reversing code.

26. The system as defined by claim 19, wherein said uphole subsystem includes means for generating an AC power signal and applying it to said uphole antenna; and wherein said downhole subsystem includes means for receiving said AC power signal for converting said signal to a downhole power supply signal.

27. The system as defined by claim 19, wherein said downhole antenna means comprises two separate antennas for receiving different signals.

28. The system as defined by claim 19, wherein said downhole subsystem includes means for storing a list of candidate codes; means in said uphole subsystem for determining a characteristic of the transmission path between the downhole and uphole subsystems; and means in said uphole subsystem for selecting a particular candidate code as a function of the determined characteristic of said transmission path, and for communicating a command to the downhole subsystem to use the particular candidate code from subsequent communications.

29. The system as defined by claim 28, wherein a sample of each of the codes is transmitted uphole, and wherein said means in said uphole subsystem for selecting a particular candidate code includes means for decoding each of said codes and determining the quality of the decoded result.

30. The system as defined by claim 16, wherein said uphole subsystem further includes means for generating control signals for controlling the downhole subsystem, and wherein said control signals are coupled to said uphole antenna means.

31. The system as defined by claim 16, further comprises downhole actuating devices, and wherein said downhole subsystem further includes means for generating control signals for controlling said actuating devices, and wherein said uphole subsystem includes means for coupling signals to said uphole antenna means for running the downhole control signals.

32. The system as defined by claim 16, wherein said uphole subsystem includes means for generating an AC power signal and applying it to said uphole antenna; and wherein said downhole subsystem includes means for receiving said AC power signal and for converting said signal to a downhole power supply signal.

33. The system as defined by claim 16, wherein said downhole antenna means comprises two separate antenna for receiving different signals.

34. The system as defined by claim 16, wherein said downhole subsystem includes means for storing a list of candidate codes; means in said uphole subsystem for determining a characteristic of the transmission path between the downhole and uphole subsystems; and means in said uphole subsystem for selecting a particular candidate code as a function of the determined characteristic of said transmission path, and for communication a common to the downhole subsystem to use the particular candidate code for subsequent communications.

35. The system as defined by claim 34, wherein a sample of each of the codes is transmitted uphole, and wherein said means in said uphole subsystem for selecting a particular candidate code includes means for decoding each of said codes and determining the quality of the decoded result.

36. For use in an earth borehole which is cased with an electrically conductive casing and has electrically conductive tubing extending therethrough; a measuring and communication system for measuring downhole conditions and communicating the measured conditions to the earth's surface, comprising:

a downhole measuring and communications subsystem mounted on said tubing, said subsystem including: means for measuring at least one downhole condition; downhole transmitter means responsive to the measured downhole condition for generating an antenna drive signal representative of the measured condition; and downhole toroidal antenna means responsive to the antenna drive signal for coupling electromagnetic energy in a TEM mode to the annulus between said casing and tubing;

an uphole communications subsystem at the earth's surface, including: uphole antenna means for coupling electromagnetic energy in a TEM mode from said annulus, an uphole receiver coupled to said uphole antenna for receiving signals representative of the measured condition;

substantially non-conductive fluid in said annulus in at least the region of said downhole antenna means and above; and conductive means below said downhole communications subsystem for electrically coupling said tubing and casing.

37. The system as defined by claim 37, further comprising a packer mounted on said tubing below said downhole communications subsystem, said packer being operative to prevent incursion of conductive fluid into said annulus.

38. The system as defined by claim 37, wherein said conductive means comprises said packer, said packer being formed of a conductive material.

39. The system as defined by claim 38, wherein said uphole antenna means comprises a transformer having a winding coupled between the casing and the tubing.

40. The system as defined by claim 39, further comprising a multiplicity of spaced-apart protective collars on said tubing, said collars being formed of an insulating material.

41. The system as defined by claim 40, wherein said collars are spaced more closely together near the downhole communications subsystem.

42. The system as defined by claim 37, further comprising a multiplicity of spaced-apart protective collars on said tubing, said collars being formed of an insulating material.

43. The system as defined by claim 37, further comprising means in said downhole system for coding said measurement information signal into a pseudorandom code, and means in said uphole subsystem for decoding said pseudorandom code.

44. The system as defined by claim 43, wherein said code is pseudorandom sign-reversing code.

45. For use in an earth borehole which is cased with an electrically conductive casing and has electrically conductive tubing extending therethrough; a method for communicating between a downhole location and the earth's surface, comprising the steps of:

encoding downhole information into a pseudorandom code signal;

transmitting said code signal from downhole to uphole in the form of electromagnetic energy in a TEM mode; receiving the transmitted code signal uphole, and demodulating the received signal to determine the modulation function attributable to the transmission path;

processing the received code signal with the determined modulation function; and decoding the processed code signal to recover the downhole information.

46. The method as defined by claim 45, wherein said code signal is a pseudorandom sign-reversing code signal.

47. The method as defined by claim 45, wherein said demodulating step comprises low pass filtering the received code signal, and wherein said processing step comprises dividing the received code signal by the determined modulation function.

48. The method as defined by claim 46, wherein said demodulating step comprises low pass filtering the received code signal, and wherein said processing step comprises dividing the received code signal by the determined modulation function.

49. For use in a borehole which is cased with an electrically conductive casing and has electrically conductive tubing extending therethrough; a method for communicating from a downhole location to the surface, comprising the steps of:

encoding downhole information into a pseudorandom sign-reversing code signal;

transmitting a number of different code signals from downhole to uphole in the form of electromagnetic energy in a TEM mode;

receiving the transmitted code signals uphole, and decoding said code signals by correlation with the patterns of said code signals;

determining a characteristic of the transmission path from the received code signals; and sending a command signal downhole to select the best available code signal for the transmission path.

50. For use in an earth borehole which is cased with an electrically conductive casing and has electrically conductive tubing extending therethrough; a method for communicating between a downhole location and the earth's surface, comprising the steps of:

inserting non-conductive fluid in said annulus in at least the region of said downhole location and above;

electrically coupling the tubing and casing below the downhole communications subsystem;

coupling information-carrying electromagnetic energy in a TEM mode from a toroidal antenna which is part of a subsystem at said downhole location to the annulus between said casing and tubing; and coupling information-carrying electromagnetic energy in a TEM mode to a subsystem at the earth's surface from said annulus.

51. The method as defined by claim 50, further comprising the step of providing a packer below said downhole location to prevent incursion of conductive fluid into said annulus.

52. The method as defined by claim 51, further comprising the step of electrically coupling the tubing and casing below said downhole location.

53. The method as defined by claim 50, further power signal and for converting said signal to a downhole power supply signal.

54. For use in an earth borehole which is cased with an electrically conductive casing and has electrically conductive tubing extending therethrough; a method for communicating between a downhole location and the earth's surface while perforation, testing, stimulation, or production of the well is being implemented via the tubing, comprising the steps of:

inserting non-conductive fluid in said annulus in at least the region of said downhole location and above;

performing an operation of perforation, testing, stimulation, or production of the well, and during said operation carrying out the following further steps:

coupling information-carrying TEM electromagnetic energy in a TEM mode from a subsystem at said downhole location to the annulus between said casing and tubing; and coupling said information-carrying electromagnetic energy in a TEM mode to a subsystem at the earth's surface from said annulus.

55. For use in an earth borehole which is cased with an electrically conductive casing and has electrically conductive tubing through the casing and spaced from the casing; a communication system for communicating between the earth's surface and downhole, comprising:

an uphole communications subsystem at the earth's surfaces, including: uphole antenna means and an uphole transmitter, said uphole antenna means coupling electromagnetic energy in a TEM mode from said transmitter to the annulus between the casing and tubing;

a downhole communications subsystem mounted on said tubing, said subsystem including: a downhole receiver and a downhole toroidal antenna means concentric the tubing for coupling electromagnetic energy in a TEM mode from the annulus to said receiver;

substantially non-conductive fluid in said annulus in at least the region of said downhole antenna means and above; and conductive means below said downhole communications subsystem for electrically coupling said tubing and casing.

56. The system as defined by claim 55, further comprising a packer mounted on said tubing below said downhole communications subsystem, said packer being operative to prevent incursion of conductive fluid into said annulus.

57. The system as defined by claim 56, wherein said conductive means comprises said packer, said packer being formed of a conductive material.

* * * * *